United States Patent
Thakor et al.

(10) Patent No.: US 12,533,429 B2
(45) Date of Patent: Jan. 27, 2026

(54) SURFACE ENHANCED RAMAN SCATTERING NANOPARTICLES AND THEIR USE IN DETECTING AND IMAGING OXIDATIVE STRESS

(71) Applicant: The Board of Trustees of the Leland Stanford Junior University, Stanford, CA (US)

(72) Inventors: Avnesh S. Thakor, Redwood City, CA (US); Mehdi Razavi, Redwood City, CA (US)

(73) Assignee: THE BOARD OF TRUSTEES OF THE LELAND STANFORD JUNIOR UNIVERSITY, Stanford, CA (US)

( * ) Notice: Subject to any disclaimer, the term of this patent is extended or adjusted under 35 U.S.C. 154(b) by 1085 days.

(21) Appl. No.: 17/617,462

(22) PCT Filed: Jun. 10, 2020

(86) PCT No.: PCT/US2020/037023
§ 371 (c)(1),
(2) Date: Dec. 8, 2021

(87) PCT Pub. No.: WO2020/252042
PCT Pub. Date: Dec. 17, 2020

(65) Prior Publication Data
US 2022/0233727 A1 Jul. 28, 2022

Related U.S. Application Data

(60) Provisional application No. 62/861,072, filed on Jun. 13, 2019.

(51) Int. Cl.
| | | |
|---|---|---|
| *A61K 51/08* | (2006.01) | |
| *A61B 5/00* | (2006.01) | |
| *A61B 6/00* | (2006.01) | |
| *A61B 6/40* | (2024.01) | |
| *A61K 49/00* | (2006.01) | |
| *A61K 51/12* | (2006.01) | |
| *G01N 21/65* | (2006.01) | |
| *G01N 33/574* | (2006.01) | |

(52) U.S. Cl.
CPC .......... *A61K 51/088* (2013.01); *A61B 5/0075* (2013.01); *A61B 6/4057* (2013.01); *A61B 6/481* (2013.01); *A61K 49/0041* (2013.01); *A61K 49/0056* (2013.01); *A61K 49/0093* (2013.01); *A61K 51/1244* (2013.01); *G01N 21/658* (2013.01); *G01N 33/574* (2013.01)

(58) Field of Classification Search
CPC .............. A61K 51/088; A61K 49/0041; A61K 49/0056; A61K 49/0093; A61K 51/1244; A61B 5/0075; A61B 6/4057; A61B 6/481; G01N 21/658; G01N 33/574; B82Y 15/00; B82Y 20/00; B82Y 30/00; G01J 3/44
See application file for complete search history.

(56) References Cited

U.S. PATENT DOCUMENTS

| | | |
|---|---|---|
| 9,482,619 B2 | 11/2016 | Long et al. |
| 2009/0140206 A1 | 6/2009 | Nie et al. |
| 2011/0230760 A1* | 9/2011 | Gambhir .............. A61B 5/0071 600/431 |
| 2016/0193588 A1 | 7/2016 | Haynes et al. |

OTHER PUBLICATIONS

Jiang et al. (2013) A chemically reactive Raman probe for ultrasensitively monitoring and imaging the in vivo generation of femtomolar oxidative species as induced by anti-tumor drugs in living cells. Chem Commun (Camb) 49(59):6647-9.
Lin et al. (2015) Elastic property of mesoporous silica shell: for dynamic surface enhanced Raman scattering ability monitoring of growing noble metal nanostructures via a simplified spatially confined growth method. ACS Appl Mater. Interfaces 7(14):7516-25.
Ahmed et al. (2002) Overexpression of alpha(v)beta6 integrin in serous epithelial ovarian cancer regulates extracellular matrix degradation via the plasminogen activation cascade. Carcinogenesis 23(2):237-44.
Yang et al. (2008) Integrin alpha v beta 6 mediates the potential for colon cancer cells to colonize in and metastasize to the liver. Cancer Sci. 99(5):879-87.
Tummers et al. (2018) Development and Preclinical Validation of a Cysteine Knottin Peptide Targeting Integrin αvβ6 for Near-infrared Fluorescent-guided Surgery in Pancreatic Cancer. Clin. Cancer Res. 24(7):1667-1676.
Kimura et al. (2012) Pharmacokinetically stabilized cystine knot peptides that bind alpha-v-beta-6 integrin with single-digit nanomolar affinities for detection of pancreatic cancer. Clin. Cancer Res. 18(3):839-49.
Kircher et al. (2012) A brain tumor molecular imaging strategy using a new triple-modality MRI-photoacoustic-Raman nanoparticle. Nat. Med. 18(5):829-34.
Harmsen et al. (2017) Cancer imaging using surface-enhanced resonance Raman scattering nanoparticles. Nat. Protoc. 12(7):1400-1414.
Zhang et al. (2016) A Cystine Knot Peptide Targeting Integrin αvβ6 for Photoacoustic and Fluorescence Imaging of Tumors in Living Subjects. J. Nucl. Med. 57(10):1629-1634.
Thakor et al. (2011) The fate and toxicity of Raman-active silica-gold nanoparticles in mice. Sci. Transl. Med. 3(79):79ra33.
Shaffer et al. (2015) Silica nanoparticles as substrates for chelator-free labeling of oxophilic radioisotopes. Nano Lett. 15(2):864-8.
Krieger et al. (2016) Reactive Oxygen Species Tune Root Tropic Responses. Plant Physiol. 172(2):1209-1220.

(Continued)

*Primary Examiner* — Robert S Cabral
(74) *Attorney, Agent, or Firm* — MARSHALL, GERSTEIN & BORUN LLP

(57) ABSTRACT

Surface enhanced Raman scattering (SERS) nanoparticles and methods of using them for detecting reactive oxygen species are disclosed. In particular, methods of using SERS nanoparticles to detect and quantify reactive oxygen species and monitor oxidative stress and disease-relevant changes in levels of reactive oxygen species are provided.

21 Claims, 34 Drawing Sheets

(56) References Cited

OTHER PUBLICATIONS

Das et al. (2015) Analyses of protein corona on bare and silica-coated gold nanorods against four mammalian cells. Int. J. Nanomedicine 10:1521-45.

Chen et al. (2017) Synthesis of Multi-Au-Nanoparticle-Embedded Mesoporous Silica Microspheres as Self-Filtering and Reusable Substrates for SERS Detection. ACS Appl Mater Interfaces. 9(48):42156-42166.

* cited by examiner

Chemical structure

SURFACE ENHANCED RAMAN SCATTERING NANOPARTICLES AND THEIR USE IN DETECTING AND IMAGING OXIDATIVE STRESS

FEDERALLY SPONSORED RESEARCH AND DEVELOPMENT

This invention was made with Government support under contract 1542152 awarded by the National Science Foundation and under contracts CA199075 and NS069375 awarded by the National Institutes of Health. The Government has certain rights in the invention.

BACKGROUND

Reactive oxygen species (ROS) are a natural by-product of aerobic respiration by mitochondria and at low levels are essential signaling molecules in many physiological processes (McCord (1974) Science, 185:529-531). However, during situations of cellular stress or inflammation, the production of ROS overwhelms the antioxidant defenses resulting in a state of oxidative stress (OS). In these circumstances, OS can cause damage to nucleic acids, lipids and proteins resulting in chromosomal instability and mutations, which, in turn, can cause genetic and/or epigenetic alterations. These changes have been hypothesized to be responsible for the dysregulation of oncogenes and tumor suppressor genes, which, in turn, can initiate carcinogenesis (Mileo et al. (2016) Oxidative Medicine and Cellular Longevity 2016:1-17). Furthermore, OS has also been shown to affect multiple signaling pathways which regulate cellular proliferation (i.e., the epidermal growth factor receptor (EGFR) signaling pathway), key signaling proteins (i.e., nuclear factor erythroid 2-related factor 2 and protein kinase C), and the expression of p53 tumor suppressor genes; all of which play a key role in tumor progression (Huo et al. (2014) American Journal of Translational Research 6:649-663).

Considerable efforts have been devoted to developing approaches to detect changes in OS. One example includes using fluorescent chemosensing molecular probes which contain organic dyes or luminescent nanoparticles that can trap, or react with, ROS to create a fluorescent turn-on or turn-off signal (Maeda et al. (2004) Angewandte Chemie International Edition, 43:2389-2391; Van de Bittner et al. (2010) Proceedings of the National Academy of Sciences 107:21316-21321) [4, 5]. However, most fluorescent probes can only detect ROS at the micromolar level and are therefore not sensitive enough to detect subtle changes in OS. Furthermore, fluorescent imaging is accompanied by drawbacks which include rapid photobleaching, large spectral overlap between agents, and high background autofluorescence (Keren et al. (2008) Proceedings of the National Academy of Sciences 105:5844-5849).

There remains a need for better methods of detecting ROS and changes in oxidative stress.

SUMMARY

Surface enhanced Raman scattering (SERS) nanoparticles and methods of using them for detecting reactive oxygen species are disclosed. In particular, methods of using SERS nanoparticles to detect and quantify reactive oxygen species and monitor oxidative stress and disease-relevant changes in levels of reactive oxygen species are provided.

In one aspect, a SERS nanoparticle is provided comprising: a) a core comprising a biocompatible metal; b) a layer comprising dihydrorhodamine123 (DHR123), wherein the DHR123 is covalently linked to the core; and c) a mesoporous outer shell comprising pores sufficiently large to allow entry of ROS through the pores such that the ROS, if present, in an environment surrounding the SERS nanoparticle is capable of entering the pores and oxidizing the DHR123 to produce rhodamine123 (Rd123).

In certain embodiments, the biocompatible metal in the core of the SERS nanoparticle is a noble metal. For example, the noble metal may include, without limitation, gold or silver.

In certain embodiments, the mesoporous outer shell comprises $SiO_2$.

In certain embodiments, the SERS nanoparticle further comprises a targeting agent attached to the mesoporous outer shell. In some embodiments, the targeting agent selectively localizes the SERS nanoparticle to cancerous cells. For example, the targeting agent may comprise a cystine knot peptide that binds to integrin $\alpha_v\beta_6$ on cancerous cells. Alternatively, the targeting agent may comprise an antibody, an antibody mimetic, a peptide, a peptoid, an aptamer, or a small molecule ligand that selectively binds to a tumor-specific antigen or a tumor-associated antigen on cancerous cells.

In certain embodiments, the SERS nanoparticle further comprises a contrast agent or a radioisotope suitable for medical imaging attached to the mesoporous outer shell. For example, the contrast agent or radioisotope may be suitable for medical imaging techniques including, without limitation, magnetic resonance imaging (MRI), positron emission tomography (PET), single photon emission computed tomography (SPECT), computed tomography (CT), ultrasound imaging (UI), optical imaging (OI), photoacoustic imaging (PI), fluoroscopy, and fluorescence imaging. In some embodiments, the contrast agent is an MRI contrast agent or a radiocontrast agent. Exemplary MRI contrast agents include, without limitation, chromium (III), manganese (II), iron (III), iron (II), cobalt (II), nickel (II), copper (II), neodymium (III), samarium (III), ytterbium (III), gadolinium (III), vanadium (II), terbium (III), dysprosium (III), holmium (III) and erbium (III) paramagnetic ions.

In certain embodiments, the radioisotope is a gamma-emitter, a beta-emitter, or a positron-emitter. Exemplary radioisotopes include, without limitation, $^{64}Cu$, $^{68}Ga$, $^{44}Sc$, $^{86}Y$, $^{89}Zr$, $^{82}Rb$, $^{11}C$, $^{13}N$, $^{15}O$, $^{18}F$, $^{67}Ga$, $^{99m}Tc$, $^{111}In$, $^{177}Lu$, $^{123}I$ and $^{131}I$.

In certain embodiments, the SERS nanoparticle further comprises an anti-cancer therapeutic agent attached to the mesoporous outer shell. Exemplary anti-cancer therapeutic agents include, without limitation, a cytotoxic agent, a drug, a toxin, a nuclease, a hormone, an immunomodulator, a pro-apoptotic agent, an anti-angiogenic agent, a boron compound, a photoactive agent, and a radioisotope.

In another aspect, a composition comprising a SERS nanoparticle, described herein, for the diagnosis of oxidative stress in a subject is provided. In certain embodiments, the composition further comprises a pharmaceutically acceptable excipient.

In another aspect, a method of using a SERS nanoparticle for detecting ROS is provided, the method comprising: a) contacting the ROS with a SERS nanoparticle described herein; and b) performing Raman spectroscopy to detect a Raman fingerprint of Rd123, wherein oxidation of DHR123 to Rd123 indicates presence of the ROS.

In certain embodiments, the method further comprises quantifying the ROS from the intensity of a Raman signal for the Rd123.

In certain embodiments, Raman spectroscopy is performed with a light source emitting near-infrared light. In some embodiments, Raman spectroscopy is performed with a light source emitting light at a wavelength of about 785 nm. In some embodiments, the light source is a laser.

In certain embodiments, detecting the Raman fingerprint of Rd123 comprises measuring an intensity of a Raman spectroscopic signal at one or more wavenumbers selected from the group consisting of 765 cm$^{-1}$, 864 cm$^{-1}$, 915 cm$^{-1}$, 1002 cm$^{-1}$, 1081 cm$^{-1}$, 1115 cm$^{-1}$, 1181 cm$^{-1}$, 1250 cm$^{-1}$, 1279 cm$^{-1}$, 1365 cm$^{-1}$, 1400 cm$^{-1}$, 1454 cm$^{-1}$, 1488 cm$^{-1}$, 1548 cm$^{-1}$, 1587 cm$^{-1}$, and 1630 cm$^{-1}$. In some embodiments, detecting the Raman fingerprint of Rd123 comprises measuring an intensity of a Raman signal at least at the wavenumber of 1365 cm$^{-1}$.

In certain embodiments, performing Raman spectroscopy comprises performing spatially offset Raman spectroscopy (SORS), inverse SORS, or micro-spatially offset Raman spectroscopy (micro-SORS).

In certain embodiments, the ROS are contacted with the SERS nanoparticle in vitro or in vivo.

In another aspect, a method of using a SERS nanoparticle for detecting ROS in a cancerous cell that overexpresses integrin $\alpha_v\beta_6$ is provided, the method comprising: a) contacting the cancerous cell with a SERS nanoparticle comprising a cystine knot peptide, wherein the cystine knot peptide binds to integrin $\alpha_v\beta_6$ on the cancerous cell; and b) performing Raman spectroscopy to detect a Raman fingerprint of Rd123, wherein oxidation of DHR123 to Rd123 indicates presence of the ROS in the cancerous cell.

In certain embodiments, the cancerous cell is pancreatic cancer, lung cancer, gastric cancer, ovarian cancer, endometrial cancer, colorectal cancer, oral cancer, skin cancer, cervical cancer, esophageal cancer, or head and neck cancer.

In certain embodiments, the cancerous cell is in a tumor biopsy, a resected surgical specimen, or in vivo in a subject.

In certain embodiments, the cancerous cell is a tumor cell or a circulating tumor cell.

In certain embodiments, the method further comprises quantitating the amount or concentration of the ROS in the cancerous cell based on an intensity of at least one spectral signal or peak in a region of a Raman spectrum containing the Raman fingerprint of Rd123.

In another aspect, a method of detecting ROS in a subject is provided, the method comprising: administering a composition comprising SERS nanoparticles, described herein, to the subject; and b) performing Raman spectroscopy at a site of interest to detect a Raman fingerprint of Rd123, wherein oxidation of DHR123 to Rd123 indicates presence of the ROS at the site of interest in the subject. In some embodiments, the subject has or is suspected of having a disease or disorder associated with oxidative stress.

In certain embodiments, the composition is administered intravenously or locally.

In certain embodiments, the site of interest comprises cancerous cells, inflammation, or ischemia.

In certain embodiments, the method is performed with a SERS nanoparticle comprising a targeting agent that selectively localizes the SERS nanoparticle to the cancerous cells. For example, the targeting agent may comprise a cystine knot peptide that binds to integrin $\alpha_v\beta_6$ on cancerous cells. Alternatively, the targeting agent may comprise an antibody, an antibody mimetic, a peptide, a peptoid, an aptamer, or a small molecule ligand that selectively binds to a tumor-specific antigen or a tumor-associated antigen on cancerous cells.

In certain embodiments, the method further comprises detecting the cancerous cells, wherein increased levels of the ROS at the site of interest compared to reference levels for a control subject (i.e., healthy subject without cancer) or noncancerous cells in the subject indicate that the cancerous cells are present at the site of interest.

In certain embodiments, the cancerous cell is a tumor cell or a circulating tumor cell.

In certain embodiments, the SERS nanoparticle further comprises a contrast agent or a radioisotope suitable for medical imaging attached to the mesoporous outer shell. In certain embodiments, the method further comprises performing medical imaging of the site of interest in the subject using the contrast agent or the radioisotope, for example, by magnetic resonance imaging (MRI), positron emission tomography (PET), single photon emission computed tomography (SPECT), computed tomography (CT), ultrasound imaging (UI), optical imaging (OI), photoacoustic imaging (PI), fluoroscopy, or fluorescence imaging.

In certain embodiments, the method further comprises treating the patient for cancer if the levels of the ROS and/or medical imaging of the site of interest indicate that the cancerous cells are present. Exemplary methods of treatment include, without limitation, surgery, radiation therapy, chemotherapy, targeted therapy, anti-angiogenic therapy, or immunotherapy, or any combination thereof.

In certain embodiments, the SERS nanoparticle further comprises an anti-cancer therapeutic agent attached to the mesoporous outer shell. Exemplary anti-cancer therapeutic agents include, without limitation, a cytotoxic agent, a drug, a toxin, a nuclease, a hormone, an immunomodulator, a pro-apoptotic agent, an anti-angiogenic agent, a boron compound, a photoactive agent, and a radioisotope.

In another aspect, a method of performing SERS-guided surgery on a patient having cancer is provided, the method comprising: a) detecting ROS in cancerous cells of the subject according to a method described herein; and b) determining where resection of cancerous tissue is needed based on locating cancerous cells by their level of oxidative stress.

In another aspect, a kit comprising a SERS nanoparticle described herein and instructions for detecting ROS by Raman spectroscopy is provided.

In another aspect, a SERS system is provided, the SERS system comprising: a) a light source emitting near infrared light; b) a SERS nanoparticle described herein; and c) a detector that can monitor SERS spectra coupled with a means to detect a Raman fingerprint of Rd123. In some embodiments, the light source is a laser. In some embodiments, the detector is a photomultiplier, a charge-coupled device (CCD) detector, an intensified charge-coupled device (ICCD), or a germanium or indium gallium arsenide (InGaAs) detector. In some embodiments, the mesoporous outer shell of the SERS nanoparticle, used in the system, is functionalized with a cystine knot peptide that binds to integrin $\alpha_v\beta_6$.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity. Included in the drawings are the following figures.

(FIG. 2C) Optimization of the SERS NPs resulted in the Rd123 peak intensities becoming significantly stronger (see y-axis). Significant differences: $^a$P<0.05: Raman intensity at 1365 cm$^{-1}$ before versus after optimization (unpaired student's t-test).

(FIG. 3A-3D)$^a$P<0.05: Femtomolar versus picomolar, nanomolar, micromolar, millimolar and molar; $^b$P<0.05: Picomolar versus nanomolar, micromolar, millimolar and molar; $^c$P<0.05: Nanomolar versus micromolar, millimolar and molar; $^d$P<0.05: Micromolar versus millimolar and molar; $^e$P<0.05: Millimolar versus molar (one-way ANOVA post-hoc Tukey test).

(FIGS. 5D-5E) $^a$P<0.05: AD-MSCs versus AsPC-1 and A431 cell line; $^b$P<0.05: AsPC-1 versus A431 cell line (One-way ANOVA post-hoc Tukey test).

(FIG. 6G) $^a$P<0.05: Control versus in vivo and ex vivo; $^b$P<0.05: In vivo versus ex vivo (one-way ANOVA post-hoc Tukey test).

DETAILED DESCRIPTION OF EMBODIMENTS

Figure 1A:
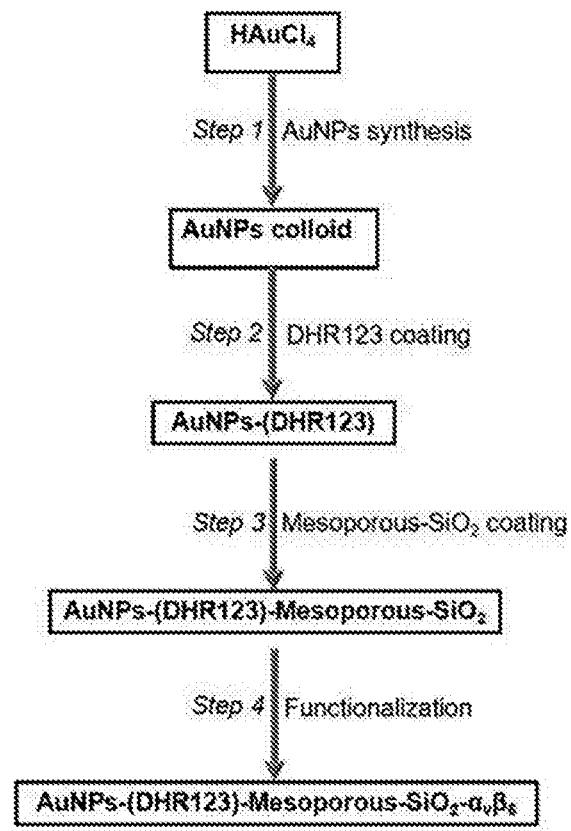
FIGS. 1A-1E. Synthesis (FIG. 1A), schematic representation (FIG. 1B), chemical structure (FIG. 1C), Raman fingerprints (FIG. 1D) and characterization (FIG. 1E) of our SERS NPs. SERS NPs have been synthesized in a 4-step procedure that includes AuNP synthesis, DHR123 coating, mesoporous-SiO$_2$ coating and functionalization with cystine knot peptide targeted at integrin $\alpha_v\beta_6$. Following reaction of our SERS NPs with ROS, the DHR123 is transformed to Rd123 and lights up the Raman signals with a fingerprint different from DHR123. Characterization of the SERS NPs with SEM, DLS, and TEM in different magnifications shows a spherical morphology of the SERS NPs with a size of 53±5 nm containing a mesoporous-SiO$_2$ with a 5±1 nm pore size.
Figure 1B:
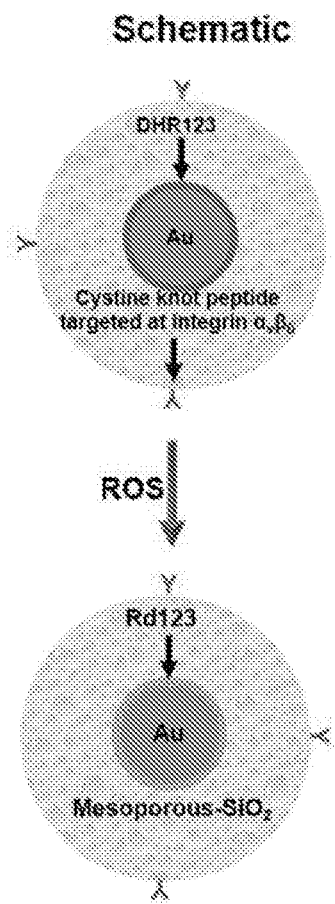
Figure 1C:
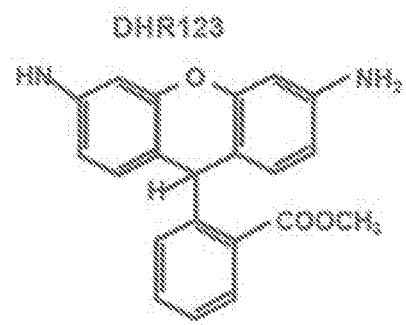
Figure 1C:
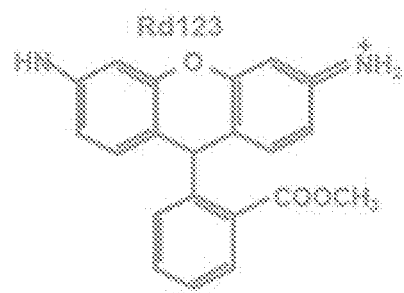
Figure 1D:
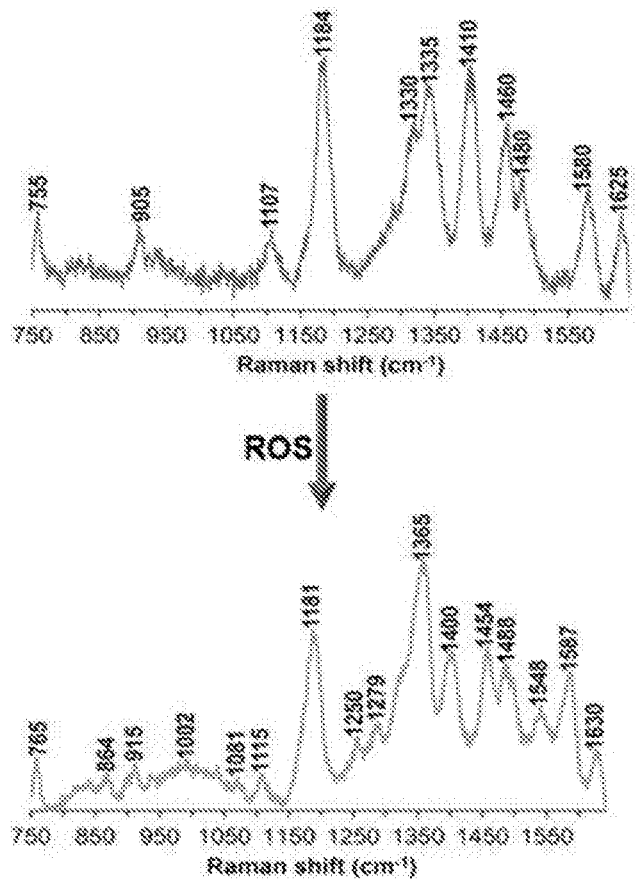
Figure 1E:
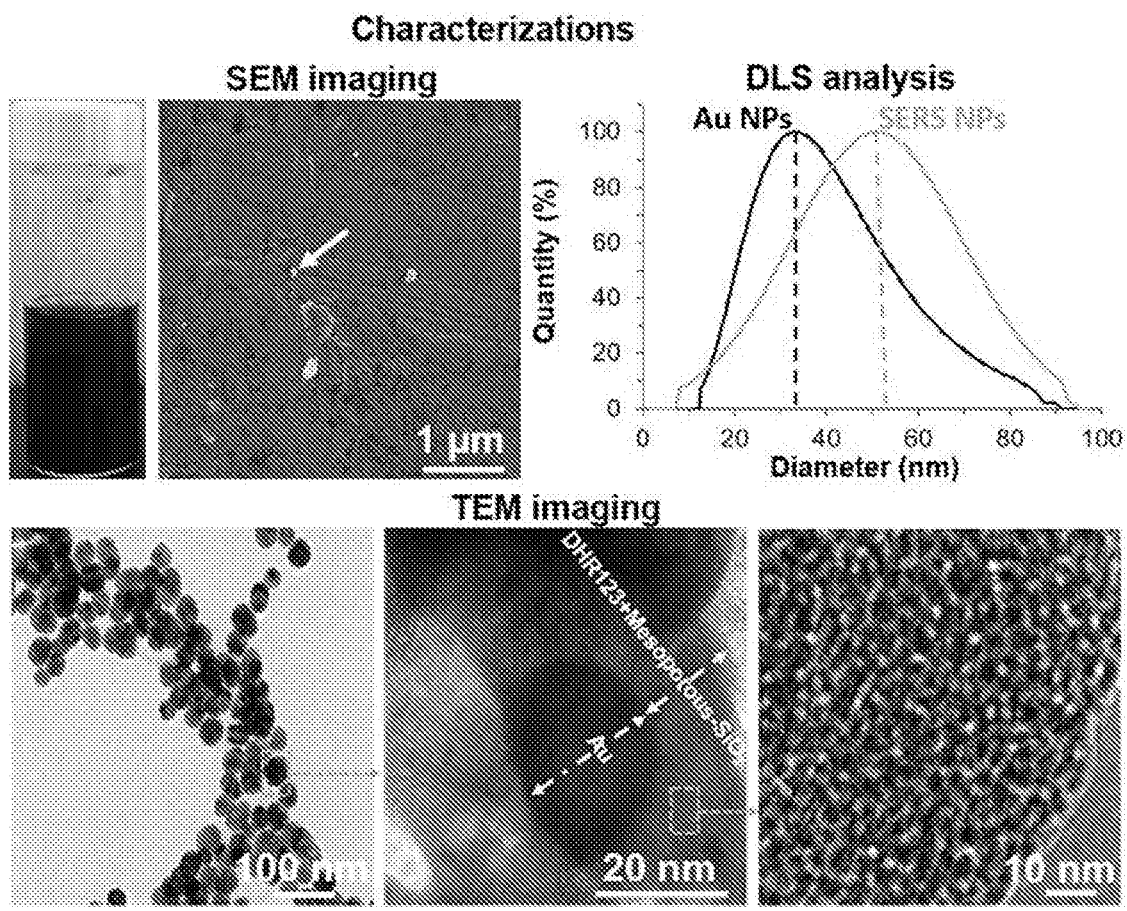

Surface enhanced Raman scattering (SERS) nanoparticles and methods of using them for detecting reactive oxygen species are disclosed. In particular, methods of using surface enhanced Raman scattering (SERS) nanoparticles to detect and quantify reactive oxygen species and monitor oxidative stress and disease-relevant changes in levels of reactive oxygen species are provided.

Before the present compositions and methods are described, it is to be understood that this invention is not limited to a particular method or composition described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, some potential and preferred methods and materials are now described. All publications mentioned herein are incorporated herein by reference to disclose and describe the methods and/or materials in connection with which the publications are cited. It is understood that the present disclosure supersedes any disclosure of an incorporated publication to the extent there is a contradiction.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

It must be noted that as used herein and in the appended claims, the singular forms "a", "an", and "the" include plural referents unless the context clearly dictates otherwise. Thus, for example, reference to "a nanoparticle" includes a plurality of such nanoparticles and reference to "the nanoparticle" includes reference to one or more nanoparticles and equivalents thereof, such as NPs or SERS NPs, known to those skilled in the art, and so forth.

As used herein, "about" or "approximately" mean within 20 percent, preferably within 10 percent, and more preferably within 5 percent of a given value or range.

"Diseases and disorders associated with oxidative stress" include any disease or disorder associated with production of abnormally high levels of reactive oxygen species including, without limitation, cancer, inflammation, ischemia, infection, attention deficit hyperactivity disorder (ADHD), Parkinson's disease, Lafora disease, Alzheimer's disease, atherosclerosis, heart failure, myocardial infarction, fragile X syndrome, sickle-cell disease, lichen planus, vitiligo, autism, Asperger syndrome, chronic fatigue syndrome (ME/CFS), and depression.

The terms "tumor," "cancer" and "neoplasia" are used interchangeably and refer to a cell or population of cells whose growth, proliferation or survival is greater than growth, proliferation or survival of a normal counterpart cell, e.g. a cell proliferative, hyperproliferative or differentiative disorder. Typically, the growth is uncontrolled. The term "malignancy" refers to invasion of nearby tissue. The term "metastasis" or a secondary, recurring or recurrent tumor, cancer or neoplasia refers to spread or dissemination of a tumor, cancer or neoplasia to other sites, locations or regions within the subject, in which the sites, locations or regions are distinct from the primary tumor or cancer. Neoplasia, tumors and cancers include benign, malignant, metastatic and non-metastatic types, and include any stage (I, II, III, IV or V) or grade (G1, G2, G3, etc.) of neoplasia, tumor, or cancer, or a neoplasia, tumor, cancer or metastasis that is progressing, worsening, stabilized or in remission. In particular, the terms "tumor," "cancer" and "neoplasia" include carcinomas, such as squamous cell carcinoma, adenocarcinoma, adenosquamous carcinoma, anaplastic carcinoma, large cell carcinoma, and small cell carcinoma, and include cancers such as, but are not limited to, pancreatic cancer, lung cancer (non-small cell lung cancer, small cell lung cancer), gastric cancer, ovarian cancer, endometrial cancer, colorectal cancer, oral cancer, skin cancer, cholangiocarcinoma, head and neck cancer, breast cancer, ovarian cancer, melanoma, peripheral neuroma, glioblastoma, adrenocortical carcinoma, AIDS-related lymphoma, anal cancer, bladder cancer, meningioma, glioma, astrocytoma, cervical cancer, chronic myeloproliferative disorders, colon cancer, endometrial cancer, ependymoma, esophageal cancer, Ewing's sarcoma, extracranial germ cell tumors, extrahepatic bile duct cancer, gallbladder cancer, gastrointestinal carcinoid tumors, gestational trophoblastic tumors, hairy cell leukemia, Hodgkin lymphoma, non-Hodgkin lymphoma, hypopharyngeal cancer, islet cell carcinoma, Kaposi sarcoma, laryngeal cancer, leukemia, lip cancer, oral cavity cancer, liver cancer, malignant mesothelioma, medulloblastoma, Merkel cell carcinoma, metastatic squamous neck cell carcinoma, multiple myeloma and other plasma cell neoplasms, mycosis fungoides and the Sezary syndrome, myelodysplastic syndromes, nasopharyngeal cancer, neuroblastoma, oropharyngeal cancer, bone cancers, including osteosarcoma and malignant fibrous histiocytoma of bone, paranasal sinus cancer, parathyroid cancer, penile cancer, pheochromocytoma, pituitary tumors, prostate cancer, rectal cancer, renal cell cancer, retinoblastoma, rhabdomyosarcoma, salivary gland cancer, small intestine cancer, soft tissue sarcoma, supratentorial primitive neuroectodermal tumors, pineoblastoma, testicular cancer, thymoma, thymic carcinoma, thyroid cancer, transitional cell cancer of the renal pelvis and ureter, urethral cancer, uterine sarcoma, vaginal cancer, vulvar cancer, and Wilm's tumor and other childhood kidney tumors.

"Substantially purified" generally refers to isolation of a substance (compound, protein, nucleic acid, nanoparticles) such that the substance comprises the majority percent of the sample in which it resides. Typically in a sample, a substantially purified component comprises 50%, preferably 80%-85%, more preferably 90-95% of the sample. Techniques for purifying substances of interest are well-known in the art and include, for example, ion-exchange chromatography, affinity chromatography and sedimentation according to density.

"Diameter" as used in reference to a shaped structure (e.g., nanoparticle, pore, cell, cell aggregate, etc.) refers to a length that is representative of the overall size of the structure. The length may in general be approximated by the diameter of a circle or sphere that circumscribes the structure.

As used herein, the terms "detectable label", "detection agent", "diagnostic agent", and "detectable moiety" are used interchangeably and refer to a molecule or substance capable of detection, including, but not limited to, fluorescers, chemiluminescers, chromophores, bioluminescent proteins, enzymes, enzyme substrates, enzyme cofactors, enzyme inhibitors, isotopic labels, semiconductor nanoparticles, dyes, metal ions, metal sols, ligands (e.g., biotin, streptavidin or haptens) and the like. The term "fluorescer" refers to a substance or a portion thereof which is capable of exhibiting fluorescence in the detectable range. Particular examples of detectable labels which may be used in the practice of the invention include isotopic labels, including radioactive and non-radioactive isotopes, such as, $^3$H, $^2$H, $^{120}$I, $^{123}$I, $^{124}$I, $^{125}$I, $^{131}$I, $^{35}$S, $^{11}$C, $^{13}$C, $^{14}$C, $^{32}$P, $^{15}$N, $^{13}$N, $^{110}$In, $^{111}$In, $^{177}$Lu, $^{18}$F, $^{52}$Fe, $^{62}$Cu, $^{64}$Cu, $^{67}$Cu, $^{67}$Ga, $^{68}$Ga, $^{86}$Y, $^{90}$Y, $^{89}$Zr, $^{94m}$Tc, $^{94}$Tc, $^{99m}$Tc, $^{154}$Gd, $^{155}$Gd, $^{156}$Gd, $^{157}$Gd, $^{158}$Gd, $^{15}$O, $^{186}$Re, $^{188}$Re, $^{51}$M, $^{52}$Mn, $^{55}$Co, $^{72}$As, $^{75}$Br, $^{76}$Br, $^{82m}$Rb, and $^{83}$Sr. In particular, detectable labels may comprise positron-emitting radionuclides suitable for PET imaging such as, but not limited to, $^{64}$Cu, $^{89}$Zr, $^{68}$Ga, $^{177}$Lu, $^{82}$Rb, $^{11}$C, $^{13}$N, $^{15}$O, and $^{18}$F; or gamma-emitting radionuclides suitable for single photon emission computed tomography (SPECT) imaging such as, but not limited to, $^{67}$Ga, $^{99m}$Tc, $^{123}$I, and $^{131}$I. Detectable labels may also include non-radioactive, paramagnetic metal ions suitable for MRI imaging such as, but not limited to, $Mn^{2+}$, $Fe^{3+}$, $Fe^{2+}$, $Gd^{3+}$, $Ti^{2+}$, $Cr^{3+}$, $Co^{2+}$, $Ni^{2+}$, and $Cu^{2+}$. Detectable labels may also include fluorophores including without limitation, SYBR green, SYBR gold, a CAL Fluor dye such as CAL Fluor Gold 540, CAL Fluor Orange 560, CAL Fluor Red 590, CAL Fluor Red 610, and CAL Fluor Red 635, a Quasar dye such as Quasar 570, Quasar 670, and Quasar 705, an Alexa Fluor such as Alexa Fluor 350, Alexa Fluor 488, Alexa Fluor 546, Alexa Fluor 555, Alexa Fluor 594, Alexa Fluor 647, and Alexa Fluor 784, a cyanine dye such as Cy 3, Cy3.5, Cy5, Cy5.5, and Cy7, fluorescein, 2', 4', 5', 7'-tetrachloro-4-7-dichlorofluorescein (TET), carboxyfluorescein (FAM), 6-carboxy-4',5'-dichloro-2',7'-dimethoxyfluorescein (JOE), hexachlorofluorescein (HEX), rhodamine, carboxy-X-rhodamine (ROX), tetramethyl rhodamine (TAMRA), FITC, dansyl, umbelliferone, dimethyl acridinium ester (DMAE), Texas red, luminol, and quantum dots, enzymes such as alkaline phosphatase (AP), beta-lactamase, chloramphenicol acetyltransferase (CAT), adenosine deaminase (ADA), aminoglycoside phosphotransferase (neo$^r$, G418$^r$) dihydrofolate reductase (DHFR), hygromycin-B-phosphotransferase (HPH), thymidine kinase (TK), β-galactosidase (lacZ), and xanthine guanine phosphoribosyltransferase (XGPRT), beta-glucuronidase (gus), placental alkaline phosphatase (PLAP), and secreted embryonic alkaline phosphatase (SEAP). Enzyme tags are used with their cognate substrate. The terms also include chemiluminescent labels such as luminol, isoluminol, acridinium esters, and peroxyoxalate and bioluminescent proteins such as firefly luciferase, bacterial luciferase, *Renilla* luciferase, and aequorin. The terms also include color-coded microspheres of known fluorescent light intensities (see e.g., microspheres with xMAP technology produced by Luminex (Austin, TX); microspheres containing quantum dot nanocrystals, for example, containing different ratios and combinations of quantum dot colors (e.g., Qdot nanocrystals produced by Life Technologies (Carlsbad, CA); glass coated metal nanoparticles (see e.g., SERS nanotags produced by Nanoplex Technologies, Inc. (Mountain View, CA); barcode materials (see e.g., sub-micron sized striped metallic rods such as Nanobarcodes produced by Nanoplex Technologies, Inc.), encoded microparticles with colored bar codes (see e.g., CellCard produced by Vitra Bioscience, vitrabio.com), glass microparticles with digital holographic code images (see e.g., CyVera microbeads produced by Illumina (San Diego, CA), near infrared (NIR) probes, and nanoshells. The terms also include contrast agents such as ultrasound contrast agents (e.g. SonoVue microbubbles comprising sulfur hexafluoride, Optison microbubbles comprising an albumin shell and octafluoropropane gas core, Levovist microbubbles comprising a lipid/galactose shell and an air core, Perflexane lipid microspheres comprising perfluorocarbon microbubbles, and Perflutren lipid microspheres comprising octafluoropropane encapsulated in an outer lipid shell), magnetic resonance imaging (MRI) contrast agents (e.g., gadodiamide, gadobenic acid, gadopentetic acid, gadoteridol, gadofosveset, gadoversetamide, gadoxetic acid), and radiocontrast agents, such as for computed tomography (CT), radiography, or fluoroscopy (e.g., diatrizoic acid, metrizoic acid, iodamide, iotalamic acid, ioxitalamic acid, ioglicic acid, acetrizoic acid, iocarmic acid, methiodal, diodone, metrizamide, iohexol, ioxaglic acid, iopamidol, iopromide, iotrolan, ioversol, iopentol, iodixanol, iomeprol, iobitridol, ioxilan, iodoxamic acid, iotroxic acid, ioglycamic acid, adipiodone, iobenzamic acid, iopanoic acid, iocetamic acid, sodium iopodate, tyropanoic acid, and calcium iopodate). The detectable label or contrast agent may be attached indirectly or directly to a SERS nanoparticle, wherein the label or contrast agent facilitates the use of the SERS nanoparticle in imaging.

"Pharmaceutically acceptable excipient or carrier" refers to an excipient that may optionally be included in the compositions of the invention and that causes no significant adverse toxicological effects to the patient.

"Pharmaceutically acceptable salt" includes, but is not limited to, amino acid salts, salts prepared with inorganic acids, such as chloride, sulfate, phosphate, diphosphate, bromide, and nitrate salts, or salts prepared from the corresponding inorganic acid form of any of the preceding, e.g., hydrochloride, etc., or salts prepared with an organic acid, such as malate, maleate, fumarate, tartrate, succinate, ethylsuccinate, citrate, acetate, lactate, methanesulfonate, benzoate, ascorbate, para-toluenesulfonate, palmoate, salicylate and stearate, as well as estolate, gluceptate and lactobionate salts. Similarly, salts containing pharmaceutically acceptable cations include, but are not limited to, sodium, potassium, calcium, aluminum, lithium, and ammonium (including substituted ammonium).

The term "antibody" encompasses monoclonal antibodies as well as hybrid antibodies, altered antibodies, chimeric antibodies, and humanized antibodies. The term antibody includes: hybrid (chimeric) antibody molecules (see, for example, Winter et al. (1991) *Nature* 349:293-299; and U.S. Pat. No. 4,816,567); F(ab')$_2$ and F(ab) fragments; F$_v$ molecules (noncovalent heterodimers, see, for example, Inbar et al. (1972) *Proc Natl Acad Sci USA* 69:2659-2662; and Ehrlich et al. (1980) *Biochem* 19:4091-4096); single-chain Fv molecules (scFv) (see, e.g., Huston et al. (1988) *Proc Natl Acad Sci USA* 85:5879-5883); nanobodies or single-domain antibodies (sdAb) (see, e.g., Wang et al. (2016) Int J Nanomedicine 11:3287-3303, Vincke et al. (2012) *Methods Mol Bio*1911:15-26; dimeric and trimeric antibody fragment constructs; minibodies (see, e.g., Pack et al. (1992) *Biochem* 31:1579-1584; Cumber et al. (1992) *J Immunology* 149B:120-126); humanized antibody molecules (see, e.g., Riechmann et al. (1988) *Nature* 332:323-327; Verhoeyan et al. (1988) *Science* 239:1534-1536; and U.K. Patent Publication No. GB 2,276,169, published 21 Sep. 1994); and, any functional fragments obtained from such molecules, wherein such fragments retain specific-binding properties of the parent antibody molecule.

The phrase "specifically (or selectively) binds" with reference to binding of an antibody to an antigen (e.g., tumor-specific antigen or a tumor-associated antigen) refers to a binding reaction that is determinative of the presence of the antigen in a heterogeneous population of proteins and other biologics. Thus, under designated immunoassay conditions, the specified antibodies bind to a particular antigen at least two times the background and do not substantially bind in a significant amount to other antigens present in the sample. Specific binding to an antigen under such conditions may require an antibody that is selected for its specificity for a particular antigen. For example, antibodies raised to an antigen from specific species such as rat, mouse, or human can be selected to obtain only those antibodies that are specifically immunoreactive with the antigen and not with other proteins, except for polymorphic variants and alleles. This selection may be achieved by subtracting out antibodies that cross-react with molecules from other species. A variety of immunoassay formats may be used to select antibodies specifically immunoreactive with a particular antigen. For example, solid-phase ELISA immunoassays are routinely used to select antibodies specifically immunoreactive with a protein (see, e.g., Harlow & Lane. Antibodies, A Laboratory Manual (1988), for a description of immunoassay formats and conditions that can be used to determine specific immunoreactivity). Typically, a specific or selective reaction will be at least twice background signal or noise and more typically more than 10 to 100 times background.

The terms "recipient", "individual", "subject", "host", and "patient", are used interchangeably herein and refer to any mammalian subject for whom diagnosis, treatment, or therapy is desired, particularly humans. "Mammal" for purposes of treatment refers to any animal classified as a mammal, including humans, domestic and farm animals, and zoo, sports, or pet animals, such as dogs, horses, cats, cows, sheep, goats, pigs, etc. Preferably, the mammal is human.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

It will be apparent to one of ordinary skill in the art that various changes and modifications can be made without departing from the spirit or scope of the invention.

SERS Nanoparticles

SERS nanoparticles useful for detecting reactive oxygen species are provided. The SERS nanoparticles comprise: a) a core comprising a biocompatible metal; b) a layer comprising dihydrorhodamine123 (DHR123), wherein the DHR123 is covalently linked to the core; and c) a mesoporous outer shell comprising pores sufficiently large to allow entry of a reactive oxygen species (ROS) through its pores such that ROS, if present in the environment surrounding the SERS nanoparticle, can enter the pores and oxidize the DHR123 to produce rhodamine123 (Rd123).

The core of the SERS nanoparticle comprises a biocompatible metal capable of surface plasmon resonance to produce enhanced Raman signals. Without wishing to be bound by theory, light at certain wavelengths causes conduction electrons in the metal core to collectively oscillate (i.e., surface plasmon resonance). At the plasmon resonant wavelength, the intensity of the local electromagnetic field on and near the nanoparticle surface increases. High-intensity fields associated with surface plasmon resonance can interact with molecules (e.g., Rd123) close to the nanoparticle surface. SERS nanoparticles can enhance Raman signals from molecules by as much as $10^{10}$-fold to $10^{11}$-fold. In some embodiments, the SERS nanoparticle core comprises a noble metal such as silver or gold.

The SERS nanoparticle has a mesoporous outer shell having permeability to ROS surrounding the nanoparticle. The mesoporous outer shell helps to protect and stabilize the metal core as well as prevents desorption of the DHR123. The pores in the mesoporous outer shell are sufficiently large to allow entry of ROS into the nanoparticle and provide access to the layer comprising DHR123. The ROS that enter the nanoparticle oxidize DHR123 to produce Rd123. This reaction can be monitored by Raman spectroscopy as DHR123 and Rd123 have different Raman fingerprints. Thus, detection of the Raman fingerprint of Rd123 indicates the presence of ROS, and allows monitoring of changes in levels of ROS in the environment surrounding the nanoparticle. In some embodiments, the mesoporous outer shell comprises mesoporous silica ($SiO_2$).

In some embodiments, the thickness of the mesoporous outer shell ranges from about 7 nm to about 30 nm, including any thickness within this range, such as 7, 8, 9, 10, 11, 12, 13, 14, 15, 16, 17, 18, 19, 20, 21, 22, 23, 24, 25, 26, 27, 28, 29, or 30 nm. In some embodiments, the mesoporous outer shell has a thickness of about 7 nm or more, e.g., about 8 nm or more, about 10 nm or more, about 12 nm or more, about 14 nm or more, about 16 nm or more, about 18 nm or more, including about 20 nm or more, and may have a thickness of about 30 nm or less, e.g., about 25 nm or less, about 20 nm or less, about 15 nm or less, about 10 nm or less, including about 7 nm or less.

In some embodiments, the pores in the mesoporous outer shell have an average diameter ranging from about 1 to 40 nanometers, including any average diameter within this range, such as 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 nm. In some embodiments, the pores have a diameter of about 4 nm or more, e.g., about 5 nm or more, about 6 nm or more, about 8 nm or more, about 10 nm or more, about 15 nm or more, including about 20 nm or more, and may have a diameter of about 30 nm or less, e.g., about 25 nm or less, about 20 nm or less, about 15 nm or less, about 10 nm or less, including about 5 nm or less.

In some embodiments, the SERS nanoparticle further comprises a surface priming or stabilizing agent, for example, including, without limitation, albumin, (3-mercaptopropyl)trimethoxysilane (MPTMS), (3-aminopropyl)-trimethoxysilane (APTMS), or polyethylene glycol (PEG)-thiol.

In some embodiments, the SERS nanoparticles have a diameter ranging from about 30 nm to 300 nm, including any diameter within this range, such as 30, 35, 40, 45, 50, 55, 60, 65, 70, 75, 80, 85, 90, 95, 100, 125, 150, 175, 200, 225, 250, 275, or 300 nm. In some embodiments, the SERS nanoparticles have a diameter of about 30 nm or more, e.g., about 35 nm or more, about 40 nm or more, about 45 nm or more, about 50 nm or more, about 55 nm or more, including about 60 nm or more, and may have a diameter of about 200 nm or less, e.g., about 100 nm or less, about 80 nm or less, about 70 nm or less, about 60 nm or less, including about 50 nm or less.

As discussed above, the oxidation of DHR123 by ROS that enter the nanoparticle to produce Rd123 can be monitored by Raman spectroscopy by detecting a spectral fingerprint for Rd123. In certain embodiments, Raman spectroscopy is performed in the near-infrared (NIR) region of the light spectrum, which ranges from about 700 nm to 1700 nm, wherein detecting the Raman fingerprint of Rd123 comprises measuring an intensity of a Raman spectroscopic signal at one or more wavenumbers selected from the group consisting of 765 $cm^{-1}$, 864 $cm^{-1}$, 915 $cm^{-1}$, 1002 $cm^{-1}$, 1081 $cm^{-1}$, 1115 $cm^{-1}$, 1181 $cm^{-1}$, 1250 $cm^{-1}$, 1279 $cm^{-1}$, 1365 $cm^{-1}$, 1400 $cm^{-1}$, 1454 $cm^{-1}$, 1488 $cm^{-1}$, 1548 $cm^{-1}$, 1587 $cm^{-1}$, and 1630 $cm^{-1}$. In some embodiments, detecting the Raman fingerprint of Rd123 comprises measuring an intensity of a Raman signal at least at the wavenumber of 1365 $cm^{-1}$.

SERS nanoparticles can be used to detect and quantify any type of chemically reactive oxygen species including, without limitation, peroxides, superoxide, hydroxyl radical, singlet oxygen, and alpha-oxygen. Accordingly, SERS nanoparticles can be used to monitor oxidative stress (i.e., abnormally high ROS levels) that is damaging to cells. For example, SERS nanoparticles can be used to detect elevated levels of reactive oxygen species in a subject who has a condition associated with development of oxidative stress. Oxidative stress may be caused, for example, as a result of environmental stress (e.g., UV or heat exposure) or a disease or disorder associated with development of oxidative stress. "Diseases and disorders associated with oxidative stress" include any disease or disorder associated with production of abnormally high levels of reactive oxygen species including, without limitation, cancer, inflammation, ischemia (e.g., stroke and heart attack), infection, attention deficit hyperactivity disorder (ADHD), Parkinson's disease, Lafora disease, Alzheimer's disease, atherosclerosis, heart failure, myocardial infarction, fragile X syndrome, sickle-cell disease, lichen planus, vitiligo, autism, Asperger syndrome, chronic fatigue syndrome (ME/CFS), and depression. ROS levels can also be increased as a result of exposure to pollutants, heavy metals, tobacco, smoke, drugs, xenobiotics, or radiation. In particular, SERS nanoparticles can be used for monitoring disease-relevant changes in levels of reactive oxygen species.

In some embodiments, SERS nanoparticles are used for detecting and/or imaging cancer. Most cancers exhibit elevated levels of ROS compared to normal cells. The levels of ROS within a tumor are affected by the size of the tumor, the stage of cancer progression, and the response to medical treatment. In certain embodiments, the SERS nanoparticle further comprises a targeting agent attached to the mesoporous outer shell that selectively localizes the SERS nanoparticle to cancerous cells. Such SERS nanoparticles selectively accumulate in tumors where they provide a detectable signal (i.e., Rd123 spectral fingerprint) from the oxidation of DHR123 by the ROS in the tumor. The intensity of Raman signals in the Rd123 fingerprint print region of Raman spectra increases with increasing number of ROS and increasing number of cancerous cells. Raman spectroscopy can be used with SERS nanoparticles to detect cancerous cells in vivo in a subject (e.g., cancerous cells in a tumor or circulating tumor cells) or cancerous cells in a biopsy or resected tumor specimen.

In some embodiments, the targeting agent comprises a cystine knot peptide that binds to integrin $\alpha_v\beta_6$, which selectively localizes the SERS nanoparticle to cancerous cells overexpressing integrin $\alpha_v\beta_6$ on their surface. Cancers that overexpress integrin $\alpha_v\beta_6$ include, without limitation, pancreatic, lung, gastric, ovarian, endometrial, colorectal, oral, skin, cervical, esophageal, and head and neck cancer.

In other embodiments, the targeting agent comprises a cancer-targeted binding agent such as an antibody, an antibody mimetic, a peptide, a peptoid, an aptamer, or a small molecule ligand that selectively binds to a tumor-specific antigen or a tumor-associated antigen on cancerous cells. Exemplary tumor-specific antigens and tumor-associated antigens include, without limitation, oncogene protein products, mutated or dysregulated tumor suppressor proteins, oncovirus proteins, oncofetal antigens, mutated or dysregulated differentiation antigens, overexpressed or aberrantly expressed cellular proteins (e.g., mutated or aberrantly expressed growth factors, mitogens, receptor tyrosine kinases, cytoplasmic tyrosine kinases, serine/threonine kinases and their regulatory subunits, G proteins, and transcription factors), and altered cell surface glycolipids and glycoproteins on cancerous cells. For example, tumor-specific antigens and tumor-associated antigens may include without limitation, dysregulated or mutated RAS, WNT, MYC, ERK, TRK, CTAG1B, MAGEA1, Bcr-Abl, p53, c-Sis, epidermal growth factor receptor (EGFR), platelet-derived growth factor receptor (PDGFR), vascular endothelial growth factor receptor (VEGFR), HER2/neu, Src-family, Syk-ZAP-70 family proteins, and BTK family of tyrosine kinases, Abl, Raf kinase, cyclin-dependent kinases, alphafetoprotein (AFP), carcinoembryonic antigen (CEA), CA-125, MUC-1, epithelial tumor antigen (ETA), tyrosinase, melanoma-associated antigen (MAGE), and other abnormal or dysregulated proteins expressed on cancerous cells. In some embodiments, the cancer-targeted binding agent binds to a tumor antigen of interest with high affinity.

In certain embodiments, the cancer-targeted binding agent comprises an antibody that specifically binds to a tumor antigen of interest. Any type of antibody may be used, including polyclonal and monoclonal antibodies, hybrid antibodies, altered antibodies, chimeric antibodies and, humanized antibodies, as well as: hybrid (chimeric) antibody molecules (see, for example, Winter et al. (1991) Nature 349:293-299; and U.S. Pat. No. 4,816,567); F(ab')$_2$ and F(ab) fragments; F$_v$ molecules (noncovalent heterodimers, see, for example, Inbar et al. (1972) Proc. Natl. Acad. Sci. USA 69:2659-2662; and Ehrlich et al. (1980) Biochem. 19:4091-4096); single-chain Fv molecules (sFv) (see, e.g., Huston et al. (1988) Proc. Natl. Acad. Sci. USA 85:5879-5883); nanobodies or single-domain antibodies (sdAb) (see, e.g., Wang et al. (2016) Int. J. Nanomedicine 11:3287-3303, Vincke et al. (2012) Methods Mol. Biol. 911:15-26; dimeric and trimeric antibody fragment constructs; minibodies (see, e.g., Pack et al. (1992) Biochem 31:1579-1584; Cumber et al. (1992) J Immunology 149B:120-126); humanized antibody molecules (see, e.g., Riechmann et al. (1988) Nature 332:323-327; Verhoeyan et al. (1988) Science 239:1534-1536; and U.K. Patent Publication No. GB 2,276,169, published 21 Sep. 1994); and, any functional fragments obtained from such molecules, wherein such fragments retain specific-binding properties of the parent antibody molecule (i.e., specifically binds to a target tumor antigen).

In other embodiments, the cancer-targeted binding agent comprises an aptamer that specifically binds to the tumor antigen of interest. Any type of aptamer may be used, including a DNA, RNA, xeno-nucleic acid (XNA), or peptide aptamer that specifically binds to the tumor antigen. Such aptamers can be identified, for example, by screening a combinatorial library. Nucleic acid aptamers (e.g., DNA or RNA aptamers) that bind selectively to a target tumor antigen can be produced by carrying out repeated rounds of in vitro selection or systematic evolution of ligands by exponential enrichment (SELEX). Peptide aptamers that bind to a target tumor antigen may be isolated from a combinatorial library and improved by directed mutation or repeated rounds of mutagenesis and selection. For a description of methods of producing aptamers, see, e.g., *Aptamers: Tools for Nanotherapy and Molecular Imaging* (R. N. Veedu ed., Pan Stanford, 2016), *Nucleic Acid and Peptide Aptamers: Methods and Protocols* (Methods in Molecular Biology, G. Mayer ed., Humana Press, 2009), *Nucleic Acid Aptamers: Selection, Characterization, and Application* (Methods in Molecular Biology, G. Mayer ed., Humana Press, 2016), *Aptamers Selected by Cell-SELEX for Theranostics* (W. Tan, X. Fang eds., Springer, 2015), Cox et al. (2001) Bioorg. Med. Chem. 9(10):2525-2531; Cox et al. (2002) Nucleic Acids Res. 30(20): e108, Kenan et al. (1999) Methods Mol. Biol. 118:217-231; Platella et al. (2016) Biochim. Biophys. Acta November 16 pii: S0304-4165(16)30447-0, and Lyu et al. (2016) Theranostics 6(9):1440-1452; herein incorporated by reference in their entireties.

In yet other embodiments, the cancer-targeted binding agent comprises an antibody mimetic. Any type of antibody mimetic may be used, including, but not limited to, affibody molecules (Nygren (2008) FEBS J. 275 (11):2668-2676), affilins (Ebersbach et al. (2007) J. Mol. Biol. 372 (1):172-185), affimers (Johnson et al. (2012) Anal. Chem. 84 (15): 6553-6560), affitins (Krehenbrink et al. (2008) J. Mol. Biol. 383 (5):1058-1068), alphabodies (Desmet et al. (2014) Nature Communications 5:5237), anticalins (Skerra (2008) FEBS J. 275 (11):2677-2683), avimers (Silverman et al. (2005) Nat. Biotechnol. 23 (12):1556-1561), darpins (Stumpp et al. (2008) Drug Discov. Today 13 (15-16):695-701), fynomers (Grabulovski et al. (2007) J. Biol. Chem. 282 (5):3196-3204), and monobodies (Koide et al. (2007) Methods Mol. Biol. 352:95-109).

SERS nanoparticles may be conjugated to binding agents by any suitable method. In some instances, the mesoporous outer shell of the nanoparticle and the binding agent may be directly linked, e.g., via a single bond, or indirectly linked e.g., through the use of a suitable linker, e.g., a polymer linker, a chemical linker, or one or more linking molecules or moieties. In some instances, attachment of the mesoporous outer shell and binding agent may be by way of one or more covalent interactions. In some instances, the mesoporous outer shell or binding agent may be functionalized, e.g., by addition or creation of a reactive functional group. Functionalized nanoparticles or binding agents may be modified to contain any convenient reactive functional group for conjugation such as an amine functional group, a hydroxyl functional group, a carboxylic functional group, a sulfhydryl group, a thiol functional group, and the like.

Any convenient method of bioconjugation may be used including, but not limited to, glutaraldehyde crosslinking, carbodiimide crosslinking, succinimide ester crosslinking, imidoester, crosslinking, maleimide crosslinking, iodoacetamide crosslinking, benzidine crosslinking, periodate crosslinking, isothiocyanate crosslinking, and the like. Such conjugation methods may optionally use a reactive sidechain group of an amino acid residue of the binding agent (e.g., a reactive side-chain group of a Lys, Cys, Ser, Thr, Tyr, His or Arg amino acid residue of the protein, i.e., a polypeptide linking group may be amino-reactive, thiol-reactive, hydroxyl-reactive, imidazolyl-reactive or guanidinyl-reactive). In some cases, a chemoselective reactive functional group may be utilized. Other conjugation reagents that can be used include, but are not limited to, e.g., homobifunctional conjugation reagents (e.g., (bis(2-[succinimidooxycarbonyloxy]ethyl) sulfone, 1,4-Di-(3'-[2'pyridyldithio]-propionamido) butane, disuccinimidyl suberate, disuccinimidyl tartrate, sulfodisuccinimidyl tartrate, dithiobis(succinimidyl propionate), 3,3'-dithiobis(sulfosuccinimidyl propionate), ethylene glycol bis(succinimidyl succinate), and the like), heterobifunctional conjugation reagents (e.g., m-maleimidobenzoyl-N-hydroxysuccinimide ester, m-maleimidobenzoyl-N-hydroxysulfosuccinimide ester, N-γ-maleimidobutyryloxysuccinimide ester, N-γ-maleimidobutyryloxysulfosuccinimide ester, N-(8-maleimidocaproic acid) hydrazide, N—(ε-maleimidocaproyloxy) succinimide ester, N-(8-maleimidocaproyloxy) sulfo succinimide ester, N-(p-maleimidophenyl) isocyanate, N-succinimidyl (4-iodoacetyl)aminobenzoate, succinimidyl 4-(N-maleimidomethyl) cyclohexane-1-carboxylate, succinimidyl 4-(p-maleimidophenyl) butyrate, N-sulfosuccinimidyl(4-iodoacetyl)aminobenzoate, sulfosuccinimidyl 4-(N-maleimidomethyl) cyclohexane-1-carboxylate, sulfo succinimidyl 4-(p-maleimidophenyl) butyrate, 1-ethyl-3-(3-dimethylaminopropyl) carbodiimide hydrochloride, 1-ethyl-3-(3-dimethylaminopropyl) carbodiimide hydrochloride, maleimide PEG N-hydroxysuccinimide ester, and the like), photoreactive conjugation reagents (e.g., p-azidobenzoyl hydrazide, N-5-azido-2-nitrobenzoyloxysuccinimide, p-azidophenyl glyoxal monohydrate, N-(4-[p-azidosalicylamido]butyl)-3'-(2'-pyridyldithio) propionamide, bis(P-[4-azidosalicylamido]-ethyl) disulfide, N-hydroxysuccinimidyl-4-azidosalicylic acid, N-hydroxysulfosuccinimidyl-4-azidobenzoate, sulfosuccinimidyl 2-(7-azido-4-methylcoumarin-3-acetamide)ethyl-1,3-dithiopropionate, sulfosuccinimidyl 2-(m-azido-o-nitrobenzamido)-ethyl-1,3'-propionate, sulfosuccinimidyl 6-(4'-azido-2'-nitrophenylamino)hexanoate, sulfosuccinimidyl (4-azidophenyl dithio)propionate, sulfosuccinimidyl-2-(p-azidosalicylamido)ethyl-1,3-dithiopropionate, and the like).

In some instances, attachment of the mesoporous outer shell of the SERS nanoparticle to a binding agent of interest is mediated by one or more functional linkers. A functional linker, as used herein, refers to any suitable linker that has one or more functional groups for the attachment of one molecule to another. For example, in some instances the functional linker comprises an amino functional group, a thiol functional group, a hydroxyl functional group, an imidazolyl functional group, a guanidinyl functional group, an alkyne functional group, an azide functional group, or a strained alkyne functional group. Further exemplary functional groups and methods of crosslinking and conjugation are described in, e.g., Hermanson *Bioconjugate Techniques* (Academic Press, 3$^{rd}$ edition, 2013), herein incorporated by reference in its entirety.

In certain embodiments, the tumor antigen targeted by a binding agent is the epidermal growth factor receptor (EGFR). A number of anti-EGFR antibodies are available including panitumumab, cetuximab, zalutumumab, nimotuzumab, and matuzumab, which can be conjugated to SERS nanoparticles for use in Raman spectroscopy, according to the methods described herein, for detection of cancerous cells expressing EGFR, including those of head and neck cancer, colorectal cancer, lung cancer, ovarian cancer, breast cancer, endometrial cancer, cervical cancer, bladder cancer, gastric cancer, and esophageal cancer.

In other embodiments, the tumor antigen targeted by a binding agent is HER2. A number of anti-HER2 antibodies are also available including trastuzumab, pertuzumab, and margetuximab, which can be conjugated to SERS nanoparticles for use in Raman spectroscopy, according to the methods described herein, for detection of cancerous cells expressing HER2, including those of breast cancer, ovarian cancer, stomach cancer, lung cancer, uterine cancer, gastric cancer, colon cancer, head and neck cancer, and salivary duct carcinoma.

In other embodiments, the tumor antigen targeted by a binding agent is the epithelial cell adhesion molecule (EpCAM) 17-1A. A number of anti-EpCAM 17-1A antibodies are also available including edrecolomab, catumaxomab, and nofetumomab, which can be conjugated to the SERS nanoparticles, for Raman spectroscopy of cancerous cells expressing EpCAM 17-1A to detect cancerous cells in epithelial-derived neoplasms and various carcinomas, such as lung cancer, gastrointestinal cancer, breast cancer, ovarian cancer, pancreatic cancer, renal cancer, cervical cancer, colorectal cancer, and bladder cancer.

In other embodiments, the tumor antigen targeted by a binding agent is CD20. A number of anti-CD20 antibodies are also available including rituximab, tositumomab, ocrelizumab, obinutuzumab, ocaratuzumab, ofatumumab, ibritumomab tiuxetan, ublituximab, and veltuzumab, which can be conjugated to SERS nanoparticles for use in Raman spectroscopy, according to the methods described herein, for detection of cancerous cells expressing CD20, including those of lymphoma such as, but not limited to, marginal zone lymphoma, Hodgkins lymphoma, non-Hodgkins lymphoma; leukemia such as, but not limited to, chronic lymphocytic leukemia, acute lymphoblastic leukemia, myelogenous leukemia, and chemotherapy-resistant hairy cell leukemia; and thyroid cancer.

In other embodiments, the tumor antigen targeted by a binding agent is CD52. A number of anti-CD52 antibodies are also available including alemtuzumab, which can be conjugated to SERS nanoparticles for use in Raman spectroscopy, according to the methods described herein, for detection of cancerous cells expressing CD52, including those of lymphoma such as, but not limited to, cutaneous T-cell lymphoma (CTCL) and T-cell lymphoma and chronic lymphocytic leukemia (CLL).

In other embodiments, the tumor antigen targeted by a binding agent is CD22. A number of anti-CD22 antibodies are also available including inotuzumab, which can be conjugated to SERS nanoparticles for use in Raman spectroscopy, according to the methods described herein, for detection of cancerous cells expressing CD22, including those of leukemia such as, but not limited to, lymphoblastic leukemia and hairy cell leukemia; lymphoma, and lung cancer.

In other embodiments, the tumor antigen targeted by a binding agent is CD19. A number of anti-C19 antibodies are also available including blinatumomab, MEDI-551 and MOR-208, which can be conjugated to SERS nanoparticles for use in Raman spectroscopy, according to the methods described herein, for detection of cancerous cells expressing CD19, including those of B-cell neoplasms, non-Hodgkin lymphoma (NHL), chronic lymphocytic leukemia (CLL), acute lymphoblastic leukemia (ALL), and multiple myeloma (MM).

Additionally, SERS nanoparticles can be used for in vivo cancer imaging. For example, the metal core of the nanoparticle can serve as a contrast agent for CT and optoacoustic imaging. Alternatively, the mesoporous outer shell can be coated with or conjugated to contrast agents for other imaging modalities. For example, the nanoparticle can be conjugated to a positron-emitting metal radionuclide suitable for PET imaging such as $^{64}$Cu, $^{68}$Ga, $^{44}$Sc, $^{86}$Y, $^{89}$Zr, or $^{82}$Rb; a gamma-emitting metal radionuclide suitable for single photon emission computed tomography (SPECT) imaging such as $^{67}$Ga, $^{99m}$Tc, $^{111}$In, or $^{177}$Lu, or a paramagnetic metal ion suitable for MRI such as paramagnetic ions of manganese (e.g., $Mn^{2+}$), iron (e.g., $Fe^{3+}$, $Fe^{2+}$) or gadolinium (e.g., $Gd^{3+}$).

SERS nanoparticles can be used in assessing the efficacy of therapeutic drugs in treating a disease or disorder associated with oxidative stress. For example, Raman spectroscopy with SERS nanoparticles can be performed after treatment with a therapy to determine if the individual is responding to treatment. In a subject with cancer, Raman spectroscopy with SERS nanoparticles by itself or combined with other medical imaging methods can be used to evaluate whether a tumor is shrinking or growing. Further, the extent of cancerous disease (how far and where the cancer has spread) can be determined to aid in determining prognosis and evaluating optimal strategies for treatment (e.g., surgery, radiation, or chemotherapy).

Additionally, SERS nanoparticles can be used to guide surgery. For example, a subject can be administered SERS nanoparticles comprising a targeting agent (e.g., cystine knot peptide that binds to integrin $\alpha_v\beta_6$ or other cancer-targeted binding agent that selectively binds to a tumor-specific antigen or a tumor-associated antigen on cancerous cells) that selectively localizes the SERS nanoparticles to cancerous cells such that the SERS nanoparticles accumulate in the cancerous cells. Alternatively, SERS nanoparticles can be administered to a subject locally to a region suspected of having cancerous cells or a tumor. Detection of elevated levels of ROS in cancerous tissues that uptake the SERS nanoparticles can be used, for example, for detection of cancerous cells, tumor margin delineation, evaluation of the completeness of resection, and evaluation of the efficacy of treatment. In some embodiments, the SERS nanoparticles are administered to a subject before surgical resection of a tumor. In other embodiments, the SERS nanoparticles are administered to a subject after surgical resection to determine the completeness of resection. In some embodiments, a resected specimen is contacted with the SERS nanoparticles to detect cancerous cells.

Additionally, the SERS nanoparticles can also be used to target therapeutic agents to the location of tumors or cancerous cells to directly treat cancer in a subject. A SERS nanoparticle can be conjugated to one or more therapeutic agents, such as, but not limited to, drugs, toxins, radioisotopes, immunomodulators, angiogenesis inhibitors, therapeutic enzymes, and cytotoxic or pro-apoptotic agents for treatment of cancer.

In some embodiments, cancer-targeted SERS nanoparticles are further conjugated to one or more chemotherapeutic agents such as, but not limited to, abitrexate, adriamycin, adrucil, amsacrine, asparaginase, anthracyclines, azacitidine, azathioprine, bicnu, blenoxane, busulfan, bleomycin, camptosar, camptothecins, carboplatin, carmustine, cerubidine, chlorambucil, cisplatin, cladribine, cosmegen, cytarabine, cytosar, cyclophosphamide, cytoxan, dactinomycin, docetaxel, doxorubicin, daunorubicin, ellence, elspar, epirubicin, etoposide, fludarabine, fluorouracil, fludara, gemcitabine, gemzar, hycamtin, hydroxyurea, hydrea, idamycin, idarubicin, ifosfamide, ifex, irinotecan, lanvis, leukeran, leustatin, matulane, mechlorethamine, mercaptopurine, methotrexate, mitomycin, mitoxantrone, mithramycin, mutamycin, myleran, mylosar, navelbine, nipent, novantrone, oncovin, oxaliplatin, paclitaxel, paraplatin, pentostatin, platinol, plicamycin, procarbazine, purinethol, ralitrexed, taxotere, taxol, teniposide, thioguanine, tomudex, topotecan, valrubicin, velban, vepesid, vinblastine, vindesine, vincristine, vinorelbine, VP-16, and vumon.

Alternatively or additionally, cancer-targeted SERS nanoparticles can be conjugated to, one or more tyrosine-kinase inhibitors, such as Imatinib mesylate (Gleevec, also known as STI-571), Gefitinib (Iressa, also known as ZD1839), Erlotinib (marketed as Tarceva), Sorafenib (Nexavar), Sunitinib (Sutent), Dasatinib (Sprycel), Lapatinib (Tykerb), Nilotinib (Tasigna), and Bortezomib (Velcade); Janus kinase inhibitors, such as tofacitinib; ALK inhibitors, such as crizotinib; Bcl-2 inhibitors, such as obatoclax and gossypol; PARP inhibitors, such as Iniparib and Olaparib; PI3K inhibitors, such as perifosine; VEGF Receptor 2 inhibitors, such as Apatinib; AN-152 (AEZS-108) doxorubicin linked to [D-Lys(6)]-LHRH; Braf inhibitors, such as vemurafenib, dabrafenib, and LGX818; MEK inhibitors, such as trametinib; CDK inhibitors, such as PD-0332991 and LEE011; Hsp90 inhibitors, such as salinomycin; and/or small molecule drug conjugates, such as Vintafolide; serine/threonine kinase inhibitors, such as Temsirolimus (Torisel), Everolimus (Afinitor), Vemurafenib (Zelboraf), Trametinib (Mekinist), and Dabrafenib (Tafinlar).

In another example, a cancer-targeted SERS nanoparticle is conjugated to a hormonal blocking therapeutic agent for treatment of a cancer depending on estrogen for growth (e.g., cancer expressing estrogen receptors ($ER_+$ cancer)). For example, the anti-B7-H3 antibody can be conjugated to a drug that blocks ER receptors (e.g. tamoxifen) or a drug that blocks the production of estrogen, such as an aromatase inhibitor (e.g. anastrozole, or letrozole).

In another example, the cancer-targeted SERS nanoparticle is conjugated to a toxin. The toxin can be of animal, plant or microbial origin. Exemplary toxins include *Pseudomonas* exotoxin, ricin, abrin, Staphylococcal enterotoxin-A, pokeweed antiviral protein, gelonin, diphtheria toxin, and *Pseudomonas* endotoxin.

In a further example, the cancer-targeted SERS nanoparticle is conjugated to an immunomodulator, such as a cytokine, a lymphokine, a monoline, a stem cell growth factor, a lymphotoxin (LT), a hematopoietic factor, a colony stimulating factor (CSF), an interferon (IFN), parathyroid hormone, thyroxine, insulin, proinsulin, relaxin, prorelaxin, follicle stimulating hormone (FSH), thyroid stimulating hormone (TSH), luteinizing hormone (LH), hepatic growth factor, prostaglandin, fibroblast growth factor, prolactin, placental lactogen, OB protein, a transforming growth factor (TGF), such as TGF-α or TGF-β, insulin-like growth factor (IGF), erythropoietin, thrombopoietin, a tumor necrosis factor (TNF) such as TNF-α or TNF-β, a mullerian-inhibiting substance, mouse gonadotropin-associated peptide, inhibin, activin, vascular endothelial growth factor, integrin, granulocyte-colony stimulating factor (G-CSF), granulocyte macrophage-colony stimulating factor (GM-CSF), an interferon such as interferon-α, interferon-β, or interferon-γ, S1 factor, an interleukin (IL) such as IL-1, IL-1 cc, IL-2, IL-3, IL-4, IL-5, IL-6, IL-7, IL-8, IL-9, IL-10, IL-11, IL-12, IL-13, IL-14, IL-15, IL-16, IL-17, IL-18 IL-21 or IL-25, LIF, kit-ligand, FLT-3, angiostatin, thrombospondin, endostatin, and LT.

In another embodiment, the SERS nanoparticle is conjugated to a radioactive isotope. Particularly useful therapeutic radionuclides include, but are not limited to $^{111}$In, $^{177}$Lu, $^{212}$Bi, $^{213}$Bi, $^{211}$At, $^{62}$Cu, $^{64}$Cu, $^{67}$Cu, $^{90}$Y, $^{123}$I, $^{125}$I, $^{131}$I, $^{32}$P, $^{33}$P, $^{77}$Br, $^{47}$Sc, $^{111}$Ag, 67Ga, $^{142}$Pr, $^{153}$Sm, $^{161}$Tb, $^{166}$Dy, $^{166}$Ho, $^{186}$Re, $^{188}$Re, $^{189}$Re, $^{212}$Pb, $^{223}$Ra, $^{225}$Ac, $^{59}$Fe, $^{75}$Se, $^{77}$As, $^{89}$Sr, $^{99}$Mo, $^{105}$Rh, 109Pb, $^{143}$Pr, $^{149}$Pm, $^{169}$Er, $^{194}$Ir, $^{198}$Au, and $^{199}$Au.

In certain embodiments, the therapeutic radionuclide has a decay energy in the range of 20 to 6,000 keV (e.g., 60 to 200 keV for an Auger emitter, 100-2,500 keV for a beta emitter, and 4,000-6,000 keV for an alpha emitter). In one embodiment, the radionuclide is an Auger-emitter (e.g., Co-58, Ga-67, Br-80m, Tc-99m, Rh-103m, Pt-109, In-111, Sb-119, I-125, Ho-161, Os-189m and Ir-192). In another embodiment, the radionuclide is an alpha-emitter (e.g., Dy-152, At-211, Bi-212, Ra-223, Rn-219, Po-215, Bi-211, Ac-225, Fr-221, At-217, Bi-213 and Fm-255).

Additional therapeutic radioisotopes include $^{11}$C, $^{13}$N, $^{15}$O, $^{75}$Br, $^{198}$Au, $^{224}$Ac, $^{126}$I, $^{133}$I, $^{77}$Br, $^{113m}$In, $^{95}$Ru, $^{97}$Ru, $^{103}$Ru, $^{105}$Ru, $^{107}$Hg, $^{203}$Hg, $^{121m}$Te, $^{122m}$Te, $^{165}$Tm, $^{167}$Tm, $^{168}$Tm, $^{197}$Pt, $^{109}$Pb, $^{105}$Rh, $^{142}$Pr, $^{143}$Pr, $^{161}$Tb, $^{166}$Ho, $^{199}$Au, $^{57}$Co, $^{51}$Cr, $^{59}$Fe, $^{75}$Se, $^{201}$Tl, $^{225}$Ac, $^{76}$Br, $^{169}$Yb, and the like.

Cancer-targeted SERS nanoparticles may also be conjugated to a boron addend-loaded carrier for thermal neutron activation therapy. For example, boron addends such as carboranes, can be attached to B7-H3-targeting agents. Carboranes can be prepared with carboxyl functions on pendant side chains, as is well-known in the art. Attachment of carboranes to a carrier, such as aminodextran, can be achieved by activation of the carboxyl groups of the carboranes and condensation with amines on the carrier. The intermediate conjugate is then conjugated to the B7-H3-targeting agent. After administration of the B7-H3-targeting agent conjugate, a boron addend is activated by thermal neutron irradiation and converted to radioactive atoms which decay by alpha-emission to produce highly toxic, short-range effects.

Pharmaceutical Compositions

SERS nanoparticles can be formulated into pharmaceutical compositions optionally comprising one or more pharmaceutically acceptable excipients. Exemplary excipients include, without limitation, carbohydrates, inorganic salts, antimicrobial agents, antioxidants, surfactants, buffers, acids, bases, and combinations thereof. Excipients suitable for injectable compositions include water, alcohols, polyols, glycerine, vegetable oils, phospholipids, and surfactants. A carbohydrate such as a sugar, a derivatized sugar such as an alditol, aldonic acid, an esterified sugar, and/or a sugar polymer may be present as an excipient. Specific carbohydrate excipients include, for example: monosaccharides, such as fructose, maltose, galactose, glucose, D-mannose, sorbose, and the like; disaccharides, such as lactose, sucrose, trehalose, cellobiose, and the like; polysaccharides, such as raffinose, melezitose, maltodextrins, dextrans, starches, and the like; and alditols, such as mannitol, xylitol, maltitol, lactitol, xylitol, sorbitol (glucitol), pyranosyl sorbitol, myo-inositol, and the like. The excipient can also include an inorganic salt or buffer such as citric acid, sodium chloride, potassium chloride, sodium sulfate, potassium nitrate, sodium phosphate monobasic, sodium phosphate dibasic, and combinations thereof.

A composition can also include an antimicrobial agent for preventing or deterring microbial growth. Nonlimiting examples of antimicrobial agents suitable for the present invention include benzalkonium chloride, benzethonium chloride, benzyl alcohol, cetylpyridinium chloride, chlorobutanol, phenol, phenylethyl alcohol, phenylmercuric nitrate, thimersol, and combinations thereof.

An antioxidant can be present in the composition as well. Antioxidants are used to prevent oxidation, thereby preventing the deterioration of the SERS nanoparticle or other components of the preparation. Suitable antioxidants for use in the present invention include, for example, ascorbyl palmitate, butylated hydroxyanisole, butylated hydroxytoluene, hypophosphorous acid, monothioglycerol, propyl gallate, sodium bisulfite, sodium formaldehyde sulfoxylate, sodium metabisulfite, and combinations thereof.

A surfactant can be present as an excipient. Exemplary surfactants include: polysorbates, such as "Tween 20" and "Tween 80," and pluronics such as F68 and F88 (BASF, Mount Olive, New Jersey); sorbitan esters; lipids, such as phospholipids such as lecithin and other phosphatidylcholines, phosphatidylethanolamines (although preferably not in liposomal form), fatty acids and fatty esters; steroids, such as cholesterol; chelating agents, such as EDTA; and zinc and other such suitable cations.

Acids or bases can be present as an excipient in the composition. Nonlimiting examples of acids that can be used include those acids selected from the group consisting of hydrochloric acid, acetic acid, phosphoric acid, citric acid, malic acid, lactic acid, formic acid, trichloroacetic acid, nitric acid, perchloric acid, phosphoric acid, sulfuric acid, fumaric acid, and combinations thereof. Examples of suitable bases include, without limitation, bases selected from the group consisting of sodium hydroxide, sodium acetate, ammonium hydroxide, potassium hydroxide, ammonium acetate, potassium acetate, sodium phosphate, potassium phosphate, sodium citrate, sodium formate, sodium sulfate, potassium sulfate, potassium fumerate, and combinations thereof.

The amount of any individual excipient in the composition will vary depending on the nature and function of the excipient and particular needs of the composition. Typically, the optimal amount of any individual excipient is determined through routine experimentation, i.e., by preparing compositions containing varying amounts of the excipient (ranging from low to high), examining the stability and other parameters, and then determining the range at which optimal performance is attained with no significant adverse effects. Generally, however, the excipient(s) will be present in the composition in an amount of about 1% to about 99% by weight, preferably from about 5% to about 98% by weight, more preferably from about 15 to about 95% by weight of the excipient, with concentrations less than 30% by weight most preferred. These foregoing pharmaceutical excipients along with other excipients are described in "Remington: The Science & Practice of Pharmacy", 19th ed., Williams &

Williams, (1995), the "Physician's Desk Reference", 52nd ed., Medical Economics, Montvale, NJ (1998), and Kibbe, A. H., Handbook of Pharmaceutical Excipients, 3rd Edition, American Pharmaceutical Association, Washington, D.C., 2000.

The compositions encompass all types of formulations and in particular those that are suited for injection, e.g., powders or lyophilates that can be reconstituted with a solvent prior to use, as well as ready for injection solutions or suspensions, dry insoluble compositions for combination with a vehicle prior to use, and emulsions and liquid concentrates for dilution prior to administration. Examples of suitable diluents for reconstituting solid compositions prior to injection include bacteriostatic water for injection, dextrose 5% in water, phosphate buffered saline, Ringer's solution, saline, sterile water, deionized water, and combinations thereof. With respect to liquid pharmaceutical compositions, solutions and suspensions are envisioned. Additional preferred compositions include those for oral or localized delivery.

The pharmaceutical preparations herein can also be housed in a syringe, an implantation device, or the like, depending upon the intended mode of delivery and use. Preferably, the compositions comprising SERS nanoparticles described herein are in unit dosage form, meaning an amount of SERS nanoparticles appropriate for a single dose, in a premeasured or pre-packaged form.

The compositions herein may optionally include one or more additional agents, such as drugs for treating a disease or disorder associated with oxidative stress or other medications used to treat a subject for a condition or disease. For example, compounded preparations may include SERS nanoparticles and one or more drugs for treating cancer, such as, but not limited to, chemotherapeutic agents, immunotherapeutic agents, biologic therapeutic agents, pro-apoptotic agents, angiogenesis inhibitors, photoactive agents, radiosensitizing drugs, and radioisotopes. Alternatively, such agents can be contained in a separate composition from the composition comprising the SERS nanoparticles and co-administered concurrently, before, or after the composition comprising the SERS nanoparticles.

Administration

A detectably effective amount of SERS nanoparticles is administered to a subject; that is, an amount that is sufficient to yield a detectable Rd123 fingerprint in a Raman spectrum or an acceptable image using the imaging equipment that is available for clinical use. A detectably effective amount of the SERS nanoparticles may be administered in more than one injection if needed. The detectably effective amount of the SERS nanoparticles needed for an individual may vary according to factors such as the degree of uptake of the SERS nanoparticles into a tissue of interest having oxidative stress (e.g., cancerous, ischemic, or infected tissue), the age, sex, and weight of the individual, and the particular medical imaging method used. Optimization of such factors is within the level of skill in the art.

The compositions comprising SERS nanoparticles are typically, though not necessarily, administered via injection (subcutaneously, intravenously, or intramuscularly), by infusion, or locally. Additional modes of administration are also contemplated, such as oral, intra-arterial, intraperitoneal, pulmonary, nasal, topical, transdermal, intralesion, intrapleural, intraparenchymatous, rectal, transdermal, transmucosal, intrathecal, pericardial, intraocular, and so forth. When administering the SERS nanoparticles by injection, the administration may be by continuous infusion or by single or multiple boluses.

The preparations are also suitable for local treatment. In a particular embodiment, a composition comprising SERS nanoparticles is used for localized delivery to a tumor. For example, compositions may be administered directly into a tumor or cancerous cells. Administration may be by perfusion through a regional catheter or direct intralesional injection.

The pharmaceutical preparation can be in the form of a liquid solution or suspension immediately prior to administration, but may also take another form such as a syrup, cream, ointment, tablet, capsule, powder, gel, matrix, suppository, or the like. The pharmaceutical compositions comprising SERS nanoparticles may be administered in accordance with any medically acceptable method known in the art.

Raman spectroscopy is performed with the nanoparticles to detect and quantify reactive oxygen species and monitor oxidative stress and disease-relevant changes in levels of reactive oxygen species. A region of interest is illuminated with light at a Raman excitation wavelength of the Rd123. Any suitable light source may be used for Raman excitation. The light source will typically be a laser including, without limitation, a gas laser or a solid-state laser. The laser may be a continuous wave or pulsed laser. Exemplary lasers used in Raman spectroscopy include, without limitation, solid-state based continuous-wave (CW) lasers such as a diode-pumped laser (e.g., with single-longitudinal mode), single-mode diode lasers (e.g., with distributed feedback or distributed Bragg reflection), or volume Bragg-grating frequency-stabilized diode lasers. Raman scattered light is typically collected and either dispersed by a spectrograph or used with an interferometer for detection by Fourier Transform methods. In addition, elastic scattered radiation can be filtered out by using a notch filter, edge pass filter, or a band pass filter. The inelastic scattering of photons is measured by a detector such as a charge-coupled device (CCD), an intensified charge-coupled device (ICCD), or a germanium or indium gallium arsenide (InGaAs) detector.

In some embodiments, Raman spectroscopy with the SERS nanoparticles is performed with near-infrared (near-IR) light, which can penetrate several millimeters to centimeters into living tissues. In some embodiments, conventional Raman spectroscopy, spatially offset Raman spectroscopy (SORS), inverse SORS, or micro-spatially offset Raman spectroscopy (micro-SORS) is used with the SERS nanoparticles.

SERS System

A SERS system that can be used for detection of oxidative stress is also provided. In some embodiments, the SERS system comprises: a) a light source emitting Raman excitation light; b) SERS nanoparticles, as described herein; and c) a detector that can monitor SERS spectra coupled with a means to detect a Raman fingerprint of Rd123. The light source should be capable of illuminating a region of interest in a subject or a surgical specimen at a Raman excitation wavelength of the Rd123 produced by oxidation of DHR123 by ROS that enter the nanoparticles. In some embodiments, the system further comprises a switch configured to control the switching on and off of the light source. Exemplary light sources that can be included in the system include continuous wave or pulsed lasers, as described above.

In certain embodiments, the system further comprises a photodetector and a controller configured to automate recording of Raman spectra including the Rd123 fingerprint spectral region. Exemplary photodetectors that may be used in the system include CODs, ICCDs, and germanium or indium gallium arsenide (InGaAs) detectors. In some embodiments, the SERS system comprises a device in which the Raman excitation light source and photodetector are integrated. Alternatively, the Raman excitation light source and photodetector may be separated to allow remote delivery of excitation light.

In certain embodiments, the system comprises a nanoparticle having a mesoporous outer shell that is functionalized with a cystine knot peptide that binds to integrin $\alpha_v\beta_6$.

Kits

Kits comprising SERS nanoparticles are also provided. In some embodiments, the kit comprises a SERS nanoparticle that selectively localizes to cancerous cells. For example, the SERS nanoparticle, included in the kit, may comprise a targeting agent that selectively binds to cancerous cells (e.g., a cystine knot peptide that binds to integrin $\alpha_v\beta_6$ on the surface of cancerous cells or an antibody, an antibody mimetic, a peptide, a peptoid, an aptamer, or a small molecule ligand that selectively binds to a tumor-specific antigen or a tumor-associated antigen on cancerous cells). In some embodiments, the SERS nanoparticle is further conjugated to one or more contrast agents or diagnostic cations suitable for medical imaging, including, without limitation, positron-emitting metal radionuclides suitable for PET imaging such as $^{64}$Cu, $^{68}$Ga, $^{44}$Sc, $^{86}$Y, $^{89}$Zr, or $^{82}$Rb; gamma-emitting metal radionuclides suitable for SPECT imaging such as $^{67}$Ga, $^{99m}$Tc, $^{111}$In, or $^{177}$Lu; or paramagnetic metal ions suitable for MRI such as a manganese (e.g., $Mn^{2+}$), iron (e.g., $Fe^{3+}$, $Fe^{2+}$) or gadolinium (e.g., $Gd^{3+}$) cations.

Compositions comprising SERS nanoparticles can be suspended in a liquid or can be lyophilized. Suitable containers for the compositions include, for example, bottles, vials, syringes, and test tubes. Containers can be formed from a variety of materials, including glass or plastic. A container may have a sterile access port (for example, the container may be an intravenous solution bag or a vial having a stopper pierceable by a hypodermic injection needle). The kit can further comprise a container comprising a pharmaceutically-acceptable buffer, such as phosphate-buffered saline, Ringer's solution, or dextrose solution. It can also contain other materials useful to the end-user, including other pharmaceutically acceptable formulating solutions such as buffers, diluents, filters, needles, and syringes or other delivery device. The kit may also provide a delivery device pre-filled with the SERS nanoparticles.

In addition to the above components, the subject kits may further include (in certain embodiments) instructions for practicing the subject methods (i.e., instructions for detecting ROS and oxidative stress by Raman spectroscopy using a Rd123 fingerprint, as described herein). These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), DVD, Blu-ray, flash drive, and the like, on which the information has been recorded. Yet another form of these instructions that may be present is a website address which may be used via the internet to access the information at a removed site.

Utility

The methods described herein are useful for monitoring disease-relevant changes in levels of reactive oxygen species in subjects who have any disease or disorder associated with production of abnormally high levels of reactive oxygen species. Diseases and disorders associated with oxidative stress include, without limitation, cancer, inflammation, ischemia (e.g., stroke and heart attack), infection, attention deficit hyperactivity disorder (ADHD), Parkinson's disease, Lafora disease, Alzheimer's disease, atherosclerosis, heart failure, myocardial infarction, fragile X syndrome, sickle-cell disease, lichen planus, vitiligo, autism, Asperger syndrome, chronic fatigue syndrome (ME/CFS), and depression.

In particular, SERS nanoparticles are useful for detecting cancer, including, but not limited to, breast cancer, ovarian cancer, melanoma, pancreatic cancer, peripheral neuroma, glioblastoma, adrenocortical carcinoma, AIDS-related lymphoma, anal cancer, bladder cancer, meningioma, glioma, astrocytoma, cervical cancer, chronic myeloproliferative disorders, colon cancer, endometrial cancer, ependymoma, esophageal cancer, Ewing's sarcoma, extracranial germ cell tumors, extrahepatic bile duct cancer, gallbladder cancer, gastric cancer, gastrointestinal carcinoid tumors, gestational trophoblastic tumors, hairy cell leukemia, Hodgkin lymphoma, non-Hodgkin lymphoma, hypopharyngeal cancer, islet cell carcinoma, Kaposi sarcoma, laryngeal cancer, leukemia, lip cancer, oral cavity cancer, liver cancer, male breast cancer, malignant mesothelioma, medulloblastoma, Merkel cell carcinoma, metastatic squamous neck cell carcinoma, multiple myeloma and other plasma cell neoplasms, mycosis fungoides and the Sezary syndrome, myelodysplastic syndromes, nasopharyngeal cancer, neuroblastoma, non-small cell lung cancer, small cell lung cancer, head and neck cancer, skin cancer, oropharyngeal cancer, bone cancers, including osteosarcoma and malignant fibrous histiocytoma of bone, paranasal sinus cancer, parathyroid cancer, penile cancer, pheochromocytoma, pituitary tumors, prostate cancer, rectal cancer, renal cell cancer, retinoblastoma, rhabdomyosarcoma, salivary gland cancer, small intestine cancer, soft tissue sarcoma, supratentorial primitive neuroectodermal tumors, pineoblastoma, testicular cancer, thymoma, thymic carcinoma, thyroid cancer, transitional cell cancer of the renal pelvis and ureter, urethral cancer, uterine sarcoma, vaginal cancer, vulvar cancer, and Wilm's tumor and other childhood kidney tumors.

EXPERIMENTAL

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

All publications and patent applications cited in this specification are herein incorporated by reference as if each individual publication or patent application were specifically and individually indicated to be incorporated by reference.

The present invention has been described in terms of particular embodiments found or proposed by the present inventor to comprise preferred modes for the practice of the invention. It will be appreciated by those of skill in the art that, in light of the present disclosure, numerous modifications and changes can be made in the particular embodiments exemplified without departing from the intended scope of the invention. For example, due to codon redundancy, changes can be made in the underlying DNA sequence without affecting the protein sequence. Moreover, due to biological functional equivalency considerations, changes can be made in protein structure without affecting the biological action in kind or amount. All such modifications are intended to be included within the scope of the appended claims.

Example 1

Imaging Tumor Oxidative Stress with Surface Enhanced Raman Scattering Gold Nanoparticles Introduction Raman spectroscopy is an optical imaging technique that detects intrinsic vibrational, rotational and other low-frequency modes in molecules upon inelastic scattering of monochromatic light. Given that different molecules will create their own Raman spectra, molecular layers can be created with different chemical functional groups which can scatter light at different frequencies, thereby producing their own individual Raman fingerprint [7]. The advantage of this technique is that these subtle molecular fingerprints can be detected within tissue. However, as the magnitude of the Raman effect is inherently weak (approximately 1 photon is inelastically scattered for every $10^7$ elastically scattered photons), this limits the sensitivity and thus the clinical applications of Raman spectroscopy. In recent years, advances in nanotechnology have enabled the synthesis of nanoparticles that can overcome this problem by taking advantage of the phenomenon known as Surface Enhanced Raman Scattering (SERS). SERS is a plasmonic effect where molecules adsorbed onto nano-roughened noble metal surfaces (i.e., gold (Au) or silver (Ag)) experience a dramatic increase in the incident electromagnetic field, thereby resulting in high Raman signals [8-10]. Raman imaging using SERS NPs has therefore been the subject of interest in biological sensing and cancer imaging applications [11, 12], because of its single-molecule sensitivity and anti-photobleaching properties [13]. Hence, we aim to create a SERS NP which provides sensitive detection of low levels of ROS and can thus detect relevant changes in OS.

Dihydrorhodamine123 (DHR123) is a molecule which is able to change configuration to rhodamine123 (Rd123) following its oxidization by ROS (FIG. 1). Given that both DHR123 and Rd123 have different Raman fingerprints, the detection of the Raman fingerprint of Rd123 will indicate the presence of ROS, and thus changes in OS, in the environment surrounding the nanoparticle. To amplify the signal from Rd123, we took advantage of SERS by apposing the DHR123 layer (which will ultimately change to Rd123) next to an AuNP using a mesoporous-SiO$_2$ shell. The mesoporous nature of the shell will allow ROS to access the DHR123 layer of our nanoparticle. Next, we functionalized our AuNP-DHR123-mesoporous-SiO$_2$ nanoparticle with a cystine knot peptide which is able to target integrin $\alpha_v\beta_6$. Given that integrin $\alpha_v\beta_6$ has been shown to be overexpressed in multiple cancers, including pancreatic [14], lung [15], gastric [16], ovarian [17], endometrial [18], colorectal [19], oral [20] and skin [21], we aim to use this nanoparticle as a potential indicator for disease progression, or response to treatment, by detecting changes in OS within tumors. Hence, in this study we synthesized AuNP-DHR123-mesoporous-SiO$_2$-$\alpha_v\beta_6$ nanoparticles (SERS NPs) and tested their ability to detect ROS in vitro as well as in vivo using a xenograft tumor model.

Materials and Methods

SERS NPs

Synthesis

SERS NPs were synthesized using a 4-step procedure which included synthesis of a gold core, coating with a Raman molecular layer (DHR123), coating with a mesoporous-SiO$_2$ shell and functionalization with a cystine knot peptide targeted at integrin $\alpha_v\beta_6$ (FIG. 1).

Gold core: The gold (Au) cores were synthesized according to the standard sodium citrate reduction method as previously described and validated [1]. Briefly, hydrogen tetrachloroaurate (III) trihydrate solution (1 w/v %, 14 mL; Fisher Scientific, USA) was added to water (ultrapure, 150 mL) and heated to boiling whilst stirring. Sodium citrate solution (1 w/v %, 24 mL; Fisher Scientific, USA) was then rapidly injected into the solution, and the resulting mixture was boiled for 0.5 h. The Au colloid was then cooled to room temperature over 2 h.

Raman molecular layer: A Raman molecular layer, dihydrorhodamine123 (DHR123), was then coated on the surface of the AuNPs as previously described and validated [2]. Briefly, O-(2-mercaptoethyl)-O'-(2-carboxyethyl) heptaethyleneglycol (PEG thiol acid, HS-PEG-COOH; Sigma Aldrich, USA) was first chemically attached to the synthesized AuNPs. For this purpose, PEG thiol acid (10 μM, 40 μL) was added into 1 mL of AuNP colloid solution with rapid mixing for 3 h, in which AuNPs-S-PEG-COOH was produced by the formation of the Au—S bond. Next, the end carboxyl groups of the PEG chain at the modified AuNPs were further activated using 1-ethyl-3-(3-dimethylaminopropyl) carbodiimide hydrochloride (EDC; Fisher Scientific, USA) and N-hydroxysuccinimide (NHS; Fisher Scientific, USA) in aqueous solution. EDC (25 mM, 20 μL) and NHS (25 mM, 20 μL) were sequentially added into 1 mL of AuNPs-S-PEG-COOH solution and allowed to react for 1 h. Finally, PEGylated AuNPs were mixed with DHR123 (1.0 mM, 40 μL, Sigma Aldrich, USA) in dimethyl sulfoxide (DMSO; Fisher Scientific, USA), and incubated at room temperature for 3 h.

Mesoporous-SiO$_2$ layer: A mesoporous-SiO$_2$ layer was coated on the surface of the Au-DHR123 NPs as previously described and validated [3]. Briefly, tetraethyl orthosilicate (TEOS; 20 v/v % in ethanol, 40 μL; Fisher Scientific, USA) was injected into 1 mL of AuNPs-DHR123 solution which was then gently stirred for 3 h.

Functionalization with a cystine knot peptide targeted at integrin $\alpha_v\beta_6$: A cystine knot peptide, R$_0$ 1, that binds integrin $\alpha_v\beta_6$ (K$_D$=3.6 nM) was synthesized, folded, and purified as previously described and validated [4]. The N terminus amine of Ro1 was used for site-specific attachment of Atto 740 (A740). For labeling, both R$_0$ 1 and A740 N-hydroxysuccinimide ester (ATTO-Tec) with the molar ratio of 1:5 were dissolved in anhydrous dimethylformamide (Sigma Aldrich, USA) to afford 10 mg/mL solutions. An equal volume of sodium bicarbonate (200 mM, pH 8.3) was added to the mixture, which was kept at room temperature for up to 1 h. A740-R$_0$ 1 was then purified by reversed-phase high-performance liquid chromatography (Higgins Analytic, USA). The mobile phase was 0.1% trifluoroacetic acid (Thermo Fisher Scientific, USA) in water (solution A) and 0.1% trifluoroacetic acid in 90% acetonitrile (Thermo Fisher Scientific, USA) in water (solution B).

The NPs were then functionalized with synthesized integrin $\alpha_v\beta_6$ as previously described and validated [5]. Briefly, PEGylated NPs were first created by addition of PEG thiol acid (10 μM, 250 μl) to 1 mL of Au-DHR123-mesoporous-SiO$_2$ NPs and the solution was left to stir for 8 h at room temperature. The end carboxyl groups of the PEG chain were activated with EDC (25 mM, 50 μL) and NHS (25 mM, 50 μL) for 1 h. The NPs were centrifuged at 5000 rpm for 5 min, the supernatant was removed, and the NPs were washed thrice with PBS. Then, integrin $\alpha_v\beta_6$ (50 μg/mL) was added to the NPs, the solution was stirred for 8 h, and EDC (25 mM, 50 μL) and NHS (25 mM, 50 μL) were added to the solution and left for 1 h at room temperature. The process of centrifugal washing was then repeated to remove any unattached reactants and the NPs were finally dispersed in 50 μL PBS.

Characterization

Synthesized SERS NPs were then characterized using Scanning Electron Microscopy (SEM), Transmission Electron Microscopy (TEM) and Dynamic Light Scattering (DLS).

Scanning Electron Microscopy (SEM): SERS NPs were prepared for SEM by pipetting 50 μL of sample solution on a SEM pin (Tedpella, USA), followed by drying at room temperature for at least one overnight before SEM analysis, and then coated with Au—Pd using a sputter coater. The morphology and size of the NPs were analyzed on images taken from 5 random locations throughout the SERS NPs by a SEM (XL30 Sirion, FEI, USA).

Transmission Electron Microscopy (TEM): SERS NPs were prepared for TEM by pipetting 5 μL of sample solution on 400-mesh carbon coated copper grids followed by drying at room temperature for at least one overnight before TEM analysis. The morphology and size of the NPs were analyzed on images taken from 5 random locations throughout the SERS NPs by a TEM (G2 F20 X-TWIN Tecnai, FEI, USA).

Dynamic Light Scattering (DLS): SERS NPs were prepared by pipetting 100 μL of sample solution in 1.5 mL distilled water and mixing for 2 min before each measurement. The size distribution profile of the SERS NPs was determined by a DLS (Brookhaven Instruments, NanoBrook Omni, USA).

Optimization

Our initial batch of SERS NPs contained 1.0 mM DHR123 and 20 v/v % mesoporous-SiO$_2$ with 0.1 femtomolar ($10^{10}$ NPs/mL) concentration. To enhance the Raman signal-to-noise ratio, SERS NPs were optimized by increasing DHR123 concentration from 1.0 to 1.5 mM, decreasing mesoporous-SiO$_2$ concentration from 20 to 10 v/v % and (iii) increasing SERS NPs concentration from 0.1 to 1 femtomolar ($10^{10}$ to $10^{11}$ NPs/mL).

Raman Imaging Apparatus

We used a Renishaw in Via Raman microscope optimized for noninvasive in vivo imaging as previously described [6, 7]. The microscope included a 785 nm near-infrared laser operating at 60 mW. Light was guided through a collimator onto a series of mirrors that focused the light through an open-field 12× microscope lens. The area of interest on the samples was illuminated with the laser beam. Scattered light from the illuminated spot was collected with a lens and then sent through a holographic edge filter to filter out the Rayleigh scattering close to the laser line. The remaining inelastic (Raman) scattered light was then focused through a slit (100 μm width) and dispersed by a diffraction grating (600 lines/mm) onto a cooled CCD detector, where the resulting Raman spectrum was sent to a workstation for further processing. Raman spectra were acquired with a laser with wavelength of 785 nm, excitation of 633 nm, and emission of 780 nm, in a dimly lit room.

Ability of SERS NPs to Detect Oxidative Stress (OS) In Vitro

Experiments were performed in triplicate. The ability of SERS NPs to detect ROS was tested using a solution which contained H$_2$O$_2$ [22-24], and using cancer cells. The expression of integrin $\alpha_v\beta_6$ in the cancer cell lines used in our study (i.e., BxPC-3: human pancreatic cancer cell line, A431: human skin cancer cell line and AsPC-1: human pancreatic cancer cell line), has been previously evaluated by flow cytometry [25]. These results have showed high integrin $\alpha_v\beta_6$ expression for BxPC-3 and A431, and low integrin $\alpha_v\beta_6$ expression for AsPC-1 [25]. We therefore selected BxPC-3 and A431 as integrin $\alpha_v\beta_6$ positive and AsPC-1 as integrin $\alpha_v\beta_6$ negative for our study. As a control, a non-cancer cell line (adipose tissue derived mesenchymal stem cells (AD-MSCs)) was also tested. The stability of SERS NPs was also tested following their incubation in acidified blood plasma with a pH of 6.5; this simulates the acidity within the tumor microenvironment [26]. The concentration of ROS in each of these conditions was also measured with a traditional fluorometric assay using Dichlorofluorescein diacetate (DCFH-DA; Sigma Aldrich, USA).

ROS solution: The ability of the SERS NPs to detect OS was tested in a solution which contained H$_2$O$_2$ (i.e., a potent ROS solution) [2, 8, 9]. Following the addition of our SERS NPs to H$_2$O$_2$ solution (30%, aqueous solution, Fisher Scientific, USA) in various concentrations, the generated Raman signal was measured using the Renishaw in Via Raman microscope system. Typically, 50 μL of H$_2$O$_2$ solutions were mixed with 50 μL of SERS NPs and allowed to react at room temperature for 30 min [2]. The resulting solution was placed onto a quartz microscope slide ((25× 76×1 mm), SPI Supplies, USA) and the Raman fingerprints were recorded from 5 random locations throughout the SERS NPs with the Renishaw Raman microscope.

To assess the stability of the SERS NPs, blood samples were collected from Female 8-week-old nude mice (Charles River Laboratories, USA). To test the effect of pH on the stability of the SERS NPs, hydrochloric acid (HCL, 1N) was added to blood plasma. To simulate the acidity of the tumor microenvironment, once blood plasma reached to pH 6.5 [10], SERS NPs were dispersed into the prepared blood plasma and incubated for 1 month at room temperature. The ability of the incubated SERS NPs to measure OS was then tested in H$_2$O$_2$ as described above.

Cancer cells: Positive and negative cell lines for integrin $\alpha_v\beta_6$, human skin (A431 cells) and pancreatic (AsPC-1) cancer cells were selected, respectively [11] and seeded in 12-well culture plates achieving a cell density of 50,000, 100,000, 200,000 and 300,000 cells/well. As a control, a non-tumor cell line in the form of adipose tissue derived mesenchymal stem cells (AD-MSCs) was also tested. Cells were incubated with $10^{10}$ SERS NPs dispersed in cell culture media (Dulbecco's Modified Eagle's medium (DMEM; Gibco, USA) supplemented with 10% fetal bovine serum (FBS; Invitrogen, USA), 50 U/mL penicillin and 50 μg/mL streptomycin) at 37° C. in a humidified incubator containing 5% CO$_2$/95% air. After 24 h, the culture media was removed and cells were washed three times with PBS to remove non-bound SERS NPs. Finally, adherent cells combined with SERS NPs were detached by treatment with 0.25% trypsin-EDTA, neutralized with DMEM-10% FBS-50 U/mL penicillin-50 μg/mL streptomycin culture medium and disaggregated into single cells by pipetting. Cells combined with SERS NPs were then centrifuged, washed thrice with PBS, resuspended in PBS (50 μL) and then imaged with the Renishaw in Via Raman microscope.

To measure ROS, a traditional fluorometric assay using Dichlorofluorescein diacetate (DCFH-DA; Sigma Aldrich, USA) was performed. DCFH-DA is a cell-permeable non-fluorescent probe which is hydrolyzed by intracellular esterases, thereby trapping it within the cell. This non-fluorescent molecule can then be oxidized by ROS, which turns it into fluorescent dichlorofluorescein (DCF). The level of intracellular fluorescence is therefore proportional to the amount of intracellular ROS production with a linear dynamic range [12]. All experiments were performed in 12-well plates. A431 and AsPC-1 cells were seeded in 12-well culture plates achieving a cell density of 50,000, 100,000, 200,000 and 300,000 cells/well. Cells were incubated with DCFH-DA (40 μM, 200 μL) in DMEM-10% FBS-50 U/mL penicillin-50 μg/mL streptomycin culture medium at 37° C. in a humidified incubator containing 5% $CO_2$/95% air for 24 h. The fluorescence from DCF was then measured using a microplate spectrophotometer system with excitation and emission wavelengths of 530 nm.

In Vivo

Female 8-week-old nude mice (Charles River Laboratories, USA) were used for all Raman spectroscopy studies. All animal related procedures were approved by the university's Institutional Animal Care and Use Committee (IACUC). To assess the ability of our SERS NPs to detect OS in tumors, an $\alpha_v\beta_6$ positive xenograft model was created using BxPC-3 cells (purchased from American Type Culture Collection (ATCC, Manassas, VA)); this model was chosen based on previous research which has used this same animal model to optimize the ability of the cystine knot peptide, which has been functionalized on our SERS NP, to target the tumors which overexpress $\alpha_v\beta_6$ integrin [27]. Tumor xenografts were prepared by subcutaneously injecting a tumor-cell suspension ($10^6$ cells/100 μl) into the lower back on the right side of mice. Xenograft animals with tumors of 1 cm³ in volume were selected for Raman imaging. Under general anesthesia (2% isoflurane), Raman imaging was performed in each mouse 4 h after SERS NPs injection (single dose IV 100 μL) using a Reinshaw in Via Raman microscope system. After Raman imaging, animals were sacrificed and their tumors excised and imaged ex vivo. The tumor tissues were then fixed in 4% paraformaldehyde (PFA), dehydrated with graded ethanol solutions, embedded in paraffin and sliced with a microtome. The sections were stained with Haemotoxylin and Eosin (H & E) via standard procedures and then imaged using a NanoZoomer slide scanner 2.0-RS (Hamamatsu, Japan).

Cell Viability

BxPC-3, A431, AsPC-1 and AD-MSCs were incubated in complete medium ($5 \times 10^4$ cells/well) in a 96 culture well-plate for 24 h to allow attachment. Cells were then incubated with $10^{10}$ SERS NPs dispersed in cell culture media at 37° C. in a humidified incubator containing 5% $CO_2$/95% air. After 7 days, the viability of cells was determined using an MTT ((4,5-dimethylthiazol-2-yl)-2,5-diphenyltetrazolium bromide) assay. Here, 50 μL of MTT solution (0.5 mg/mL) was added to the complete medium in each well and left to incubate at 37° C. for 4 h. Water-soluble MTT is taken up by viable cells and converted to insoluble formazan. Next, 200 μL of DMSO (to dissolve the formazan) was added to each well and left at 37° C. for a further 10 min before the absorbance was measured at 570 nm using a microplate spectrophotometer system—the absorbance directly relates to the number of viable cells Present [13]. Cell viability was determined using the following equation (Eq. (1)):

$$\text{Cell viability} = \frac{OD_{sample}}{OD_{control}} \quad (1)$$

$OD_{sample}$ is the optical density (absorbance) of cells incubated with SERS NPs and $OD_{control}$ is the optical density (absorbance) of cells that were not incubated with our SERS NPs.

Statistical Analysis

All results were expressed as mean±standard error of the mean. Statistical analysis of all quantitative data was performed by one-way ANOVA with post-hoc Tukey test (Astatsa.com; Online Web Statistical Calculators, USA) with any differences considered statistically significant when P<0.05.

Results

Characterization of SERS NPs

SEM imaging, DLS analysis and TEM imaging showed that synthesized SERS NPs had a spherical morphology with a particle size of 53±5 nm. DLS analysis showed that synthesized AuNPs had a 32±2 nm size which increased to 53±5 nm following mesoporous-$SiO_2$ coating. TEM images also confirmed that the mesoporous-$SiO_2$ coating thickness was 10±3 nm with a pore size of 5±1 nm (FIG. 1).

Figure 2A:
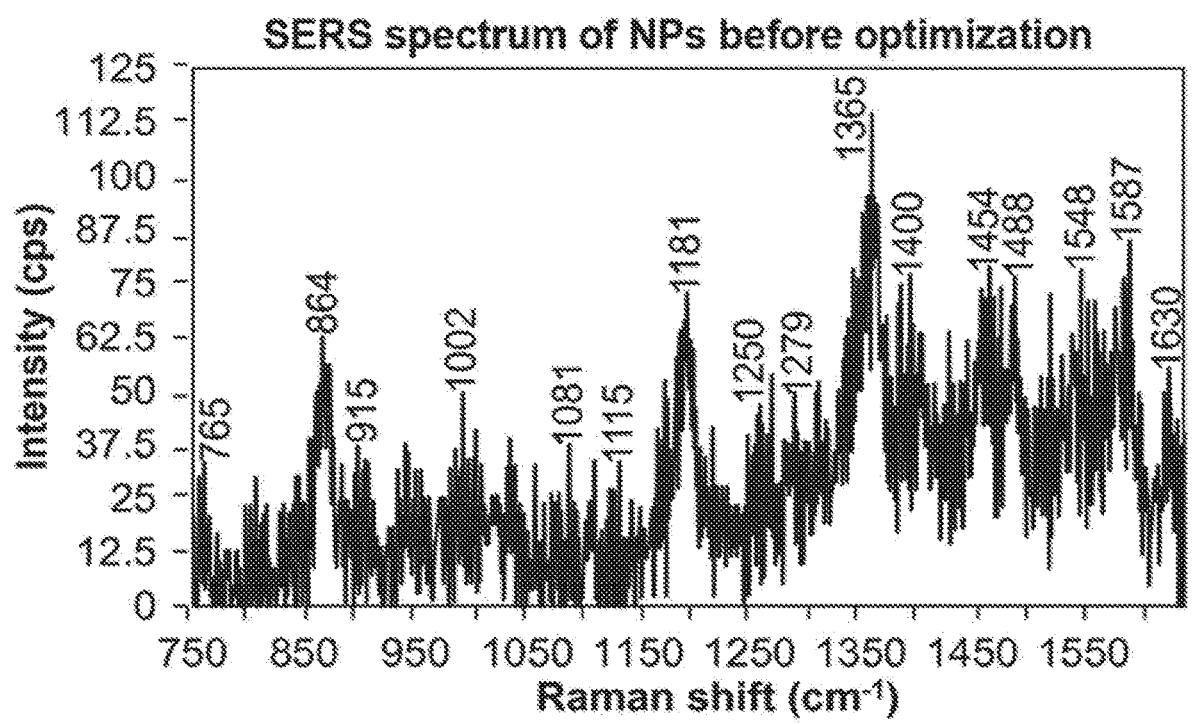
FIGS. 2A-2C. Raman fingerprints of SERS NPs before (FIG. 2A) and after (FIG. 2B) optimization. Following reaction of our SERS NPs with H$_2$O$_2$, they became oxidized and characteristic peaks of Rd123 were detected at 765, 864, 915, 1002, 1081, 1115, 1181, 1250, 1279, 1365, 1400, 1454 1488, 1548, 1587, and 1630 cm$^{-1}$.
Figure 2B:
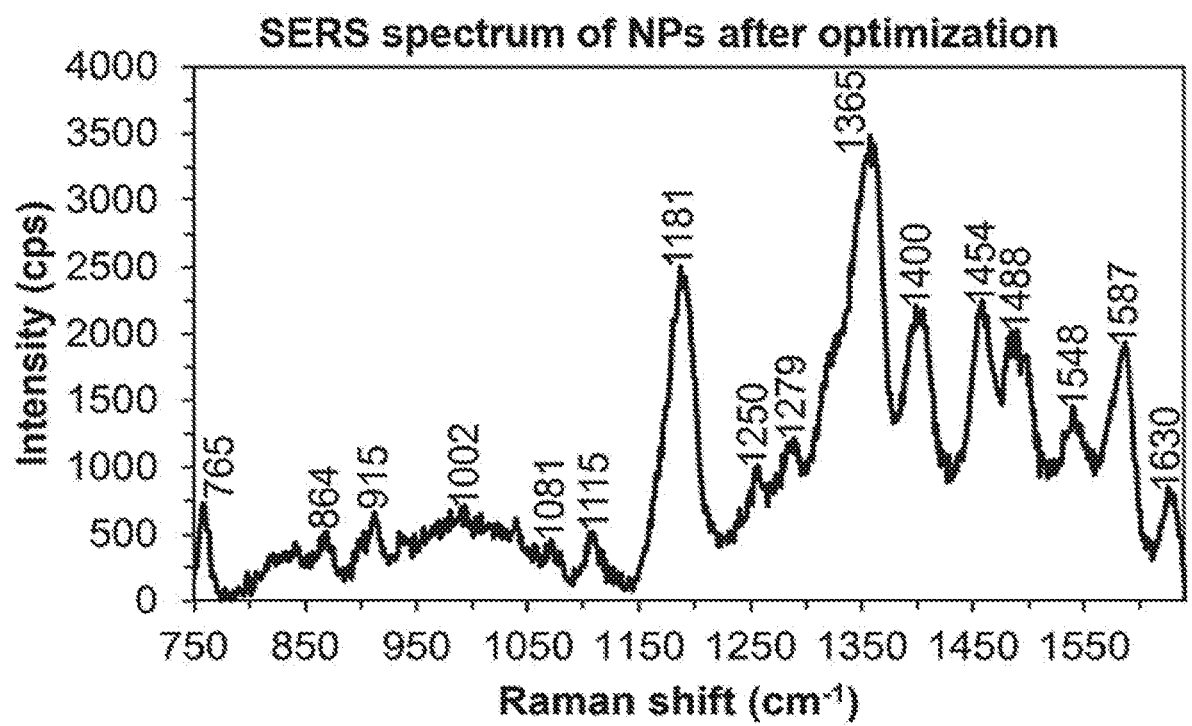
Figure 2C:
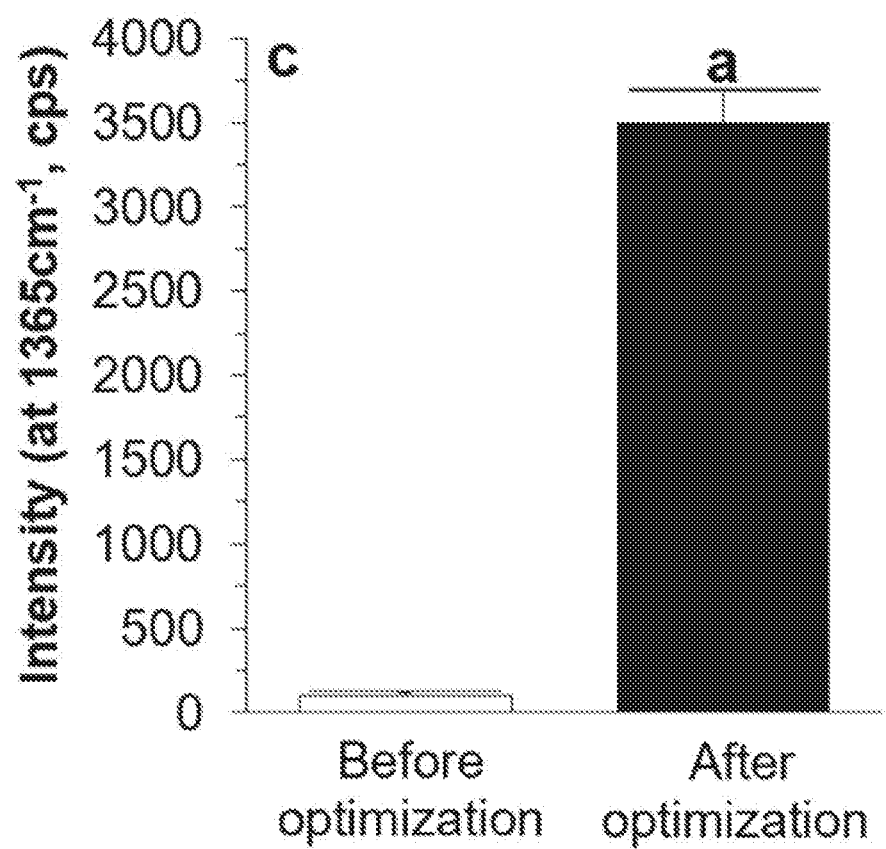

Ability of SERS NPs to Detect Oxidative Stress (OS)

i. In Vitro: Following addition of our SERS NPs to $H_2O_2$ solution, characteristic peaks of Rd123 could be observed at 765, 864, 915, 1002, 1081, 1115, 1181, 1250, 1279, 1365, 1400, 1454, 1488, 1548, 1587, and 1630 cm⁻¹ (FIG. 2A, P<0.05). By (i) increasing DHR123 concentration from 1.0 to 1.5 mM, (ii) decreasing mesoporous-$SiO_2$ concentration from 20 to 10 v/v % and (iii) increasing SERS NPs concentration from 0.1 to 1 femtomolar ($10^{10}$ to $10^{11}$ NPs/mL), there was a significant increase in the Rd123 peak intensities, especially at 1365 cm⁻¹ (FIGS. 2B-2C), P<0.05).

Figure 3A:
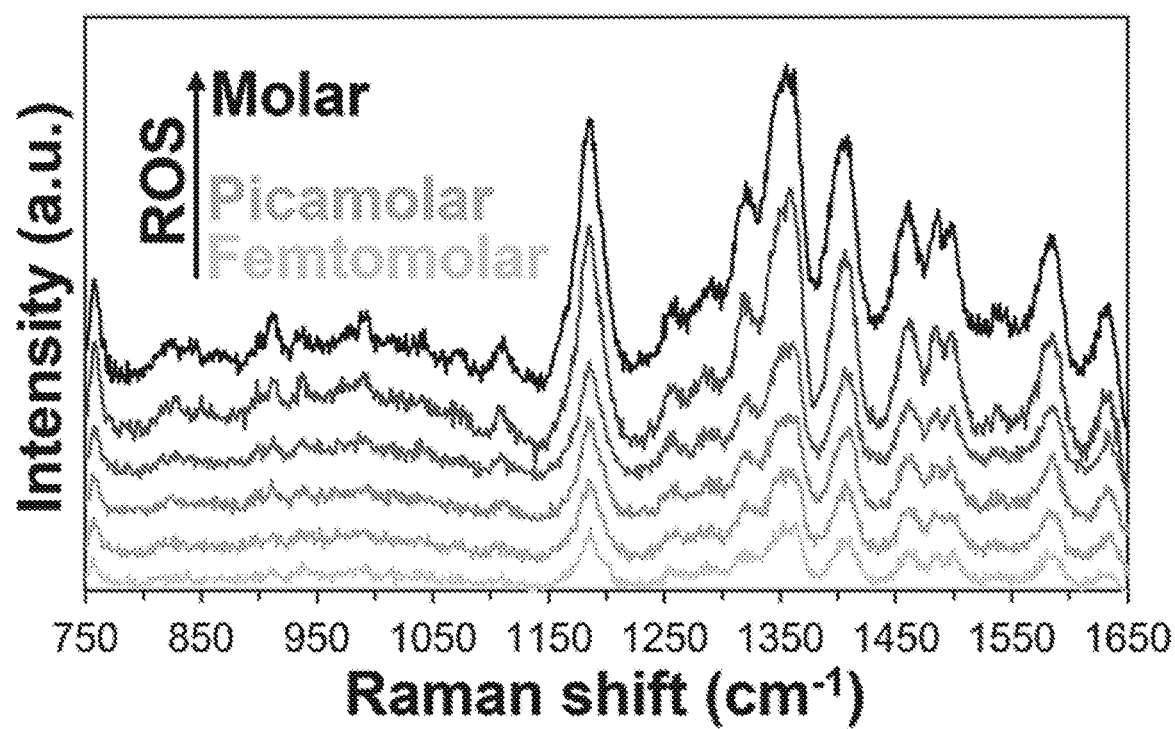
FIGS. 3A-3D. Sensitivity (a-d) and stability (e-f) of SERS NPs to detect OS. Raman fingerprints of optimized SERS NPs following reaction with H$_2$O$_2$ with different concentrations showing the femtomolar sensitivity of SERS NPs. After incubation of SERS NPs in an acidic blood plasma (pH 6.5), nearly identical Raman signals were observed showing the stability of SERS NPs. Significant differences.
Figure 3B:
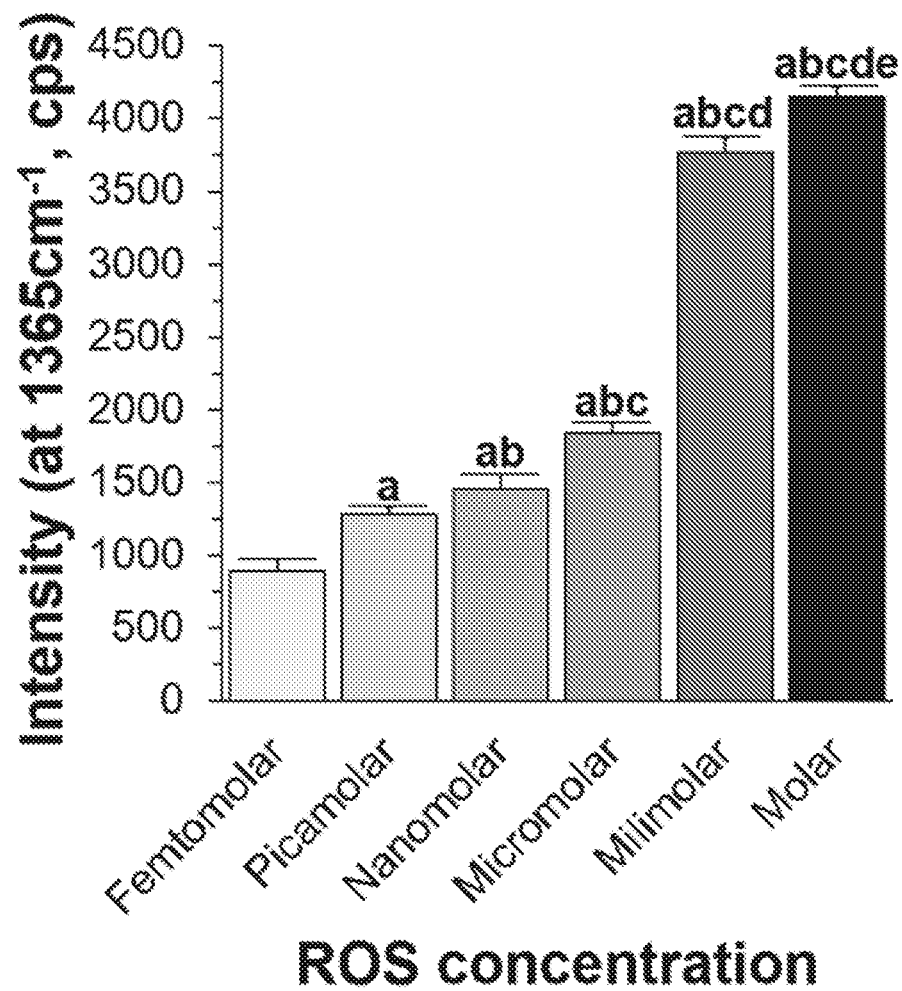

In order to verify the sensitivity of our SERS NPs, we tested our optimized SERS NPs (DHR123 concentration: 1.5 mM, mesoporous-$SiO_2$ concentration: 10 v/v % and SERS NPs concentration: 1 femtomolar ($10^{11}$ NPs/mL)) with a range of ROS concentrations using a $H_2O_2$ solution. Our results showed that our SERS NPs could react with ROS solution at femtomolar levels and as the ROS concentration increased from femtomolar to molar levels, this resulted in a stronger Raman fingerprint of Rd123; the intensity of the sharpest signal at 1365 cm⁻¹ was significantly enhanced by increasing the ROS concentration from femtomolar (893±80 cps), to picomolar (1285±50 cps), nanomolar (1460±100 cps), micromolar (1838±75 cps), millimolar (3773±100 cps), and molar (4155±65 cps) levels (FIGS. 3A-3B), P<0.05).

Figure 3C:
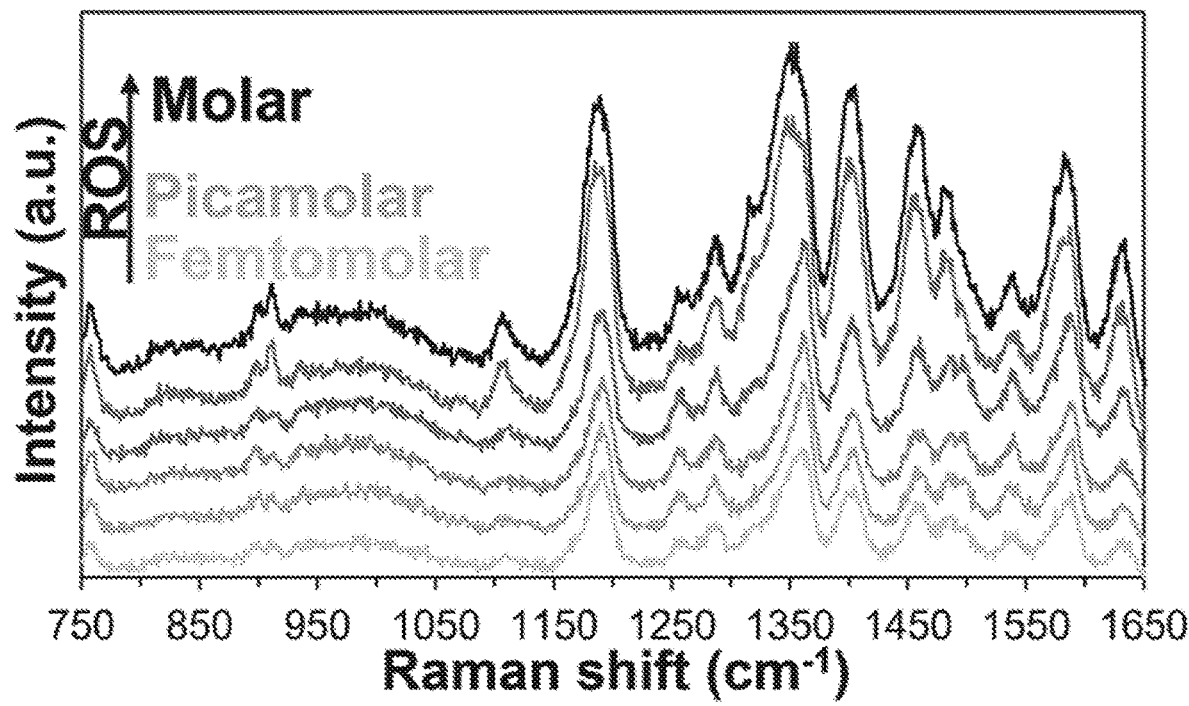
Figure 3D:
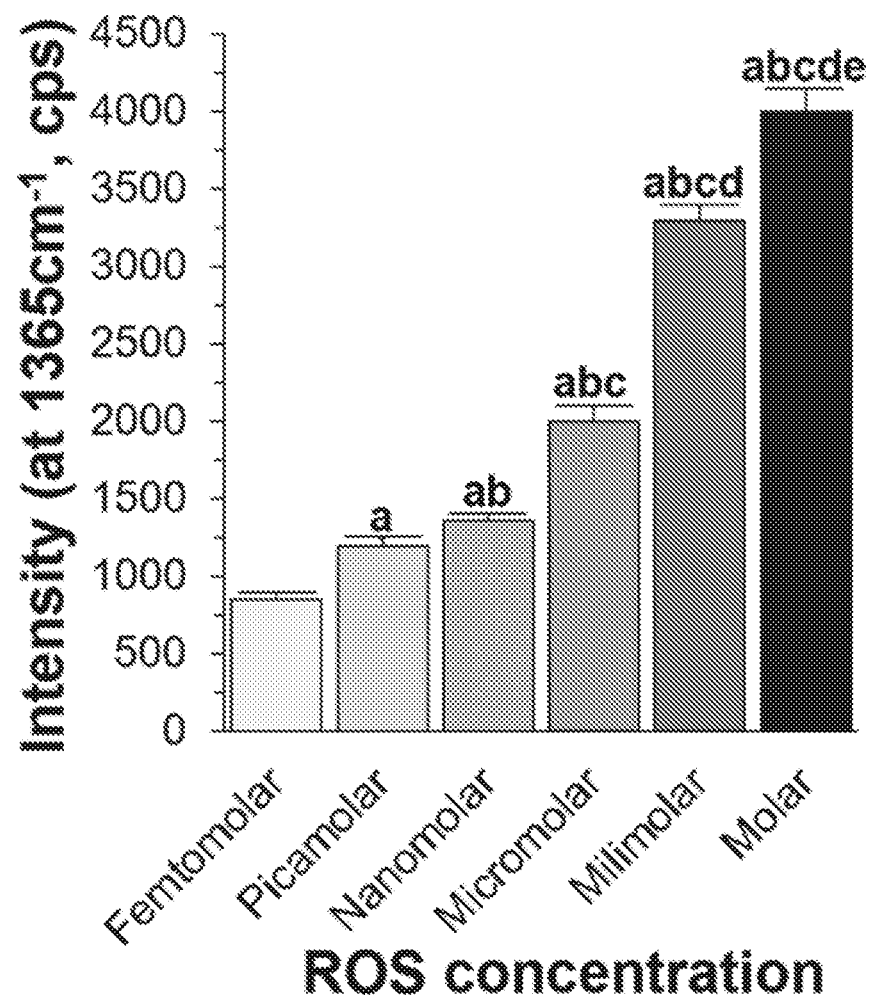

To verify the stability of our SERS NPs, we tested the ability of our SERS NPs to still detect a range of ROS concentrations following its incubation in acidic blood plasma for 30 days. Our results show that SERS NPs were still able to detect ROS (i.e., using a $H_2O_2$ solution), producing nearly identical intensity Raman fingerprints when compared to SERS NPs before incubation (P>0.05). Furthermore, the intensity of the sharpest signal at 1365 cm⁻¹ again significantly enhanced by increasing the ROS concentration from femtomolar (850±50 cps), to picomolar (1200±50 cps), nanomolar (1360±50 cps), micromolar (2000±100 cps), millimolar (3300±100 cps), and molar (4000±150 cps) levels (FIGS. 3C-3D), P<0.05).

Figure 4A:
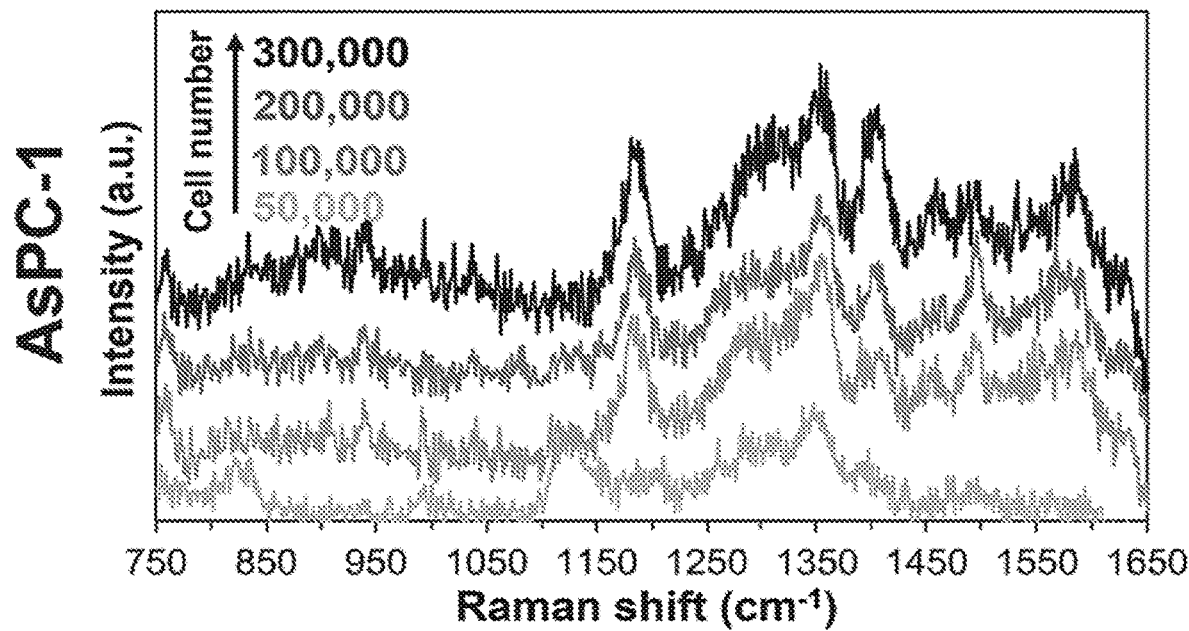
FIGS. 4A-4F. Ability of SERS NPs to detect OS in cancer cells. Raman fingerprints (FIGS. 4A, 4D), Raman signal intensities (FIGS. 4B, 4E) and DCFH-DA assays (FIGS. 4C, 4F) of AsPC-1 (FIGS. 4A-4C) and A431 (FIGS. 4D-4F) cells cultured with SERS NPs showing the ability of SERS NPs to detect OS in cancer cells. Significant differences: $^a$P<0.05: 50,000 versus 100,000, 200,000 and 300,000 cells; $^b$P<0.05: 100,000 versus 200,000 and 300,000 cells; $^c$P<0.05: 200,000 versus 300,000 cells (one-way ANOVA post-hoc Tukey test).
Figure 4B:
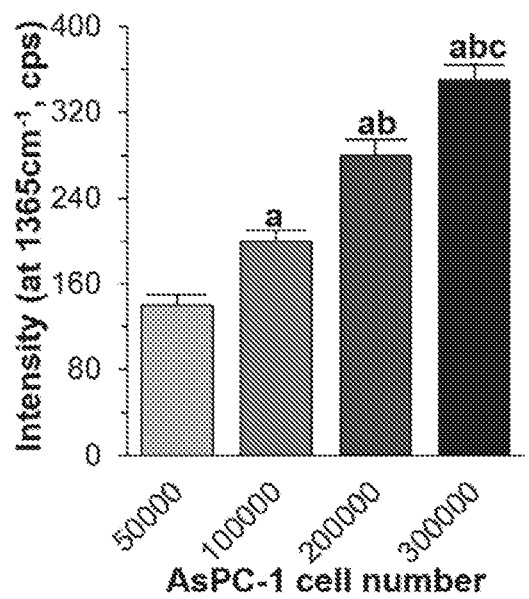
Figure 4C:
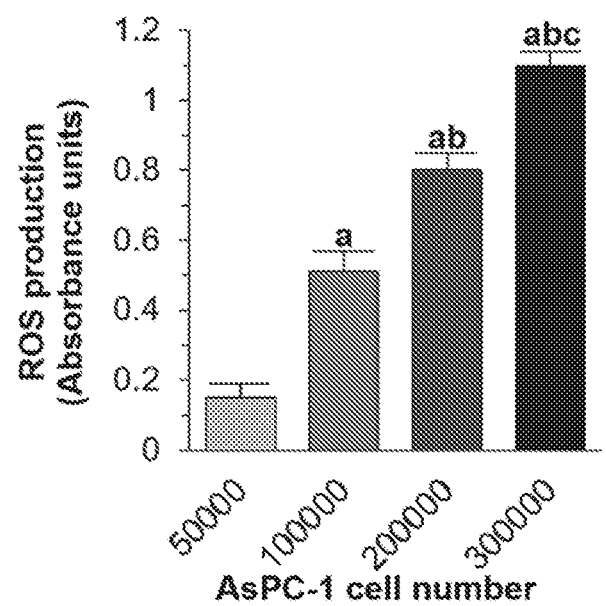
Figure 4D:
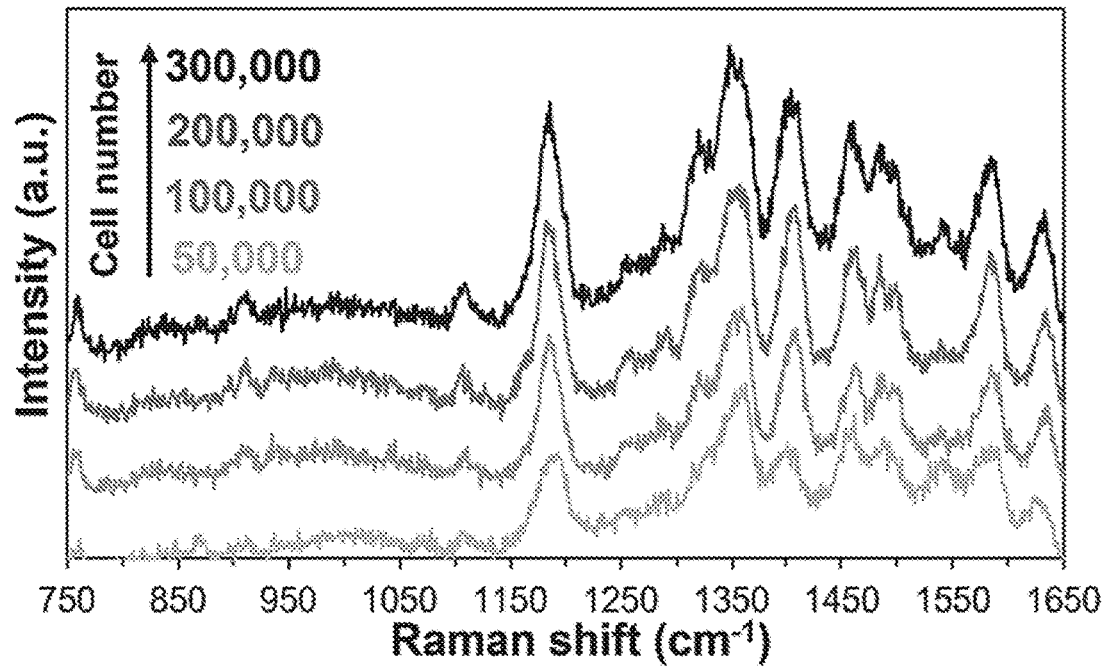
Figure 4E:
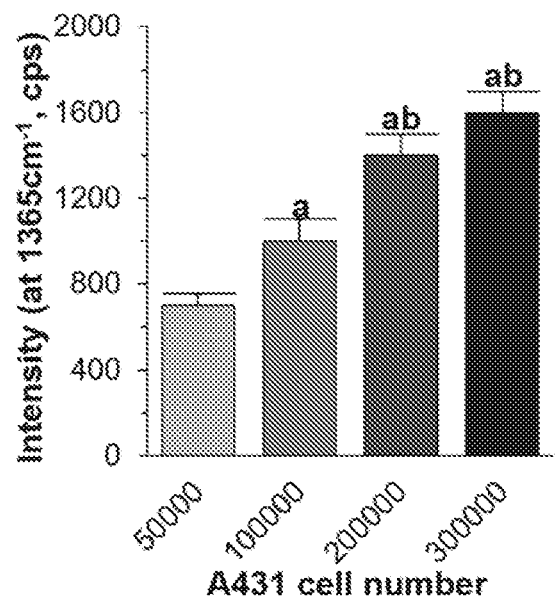
Figure 4F:
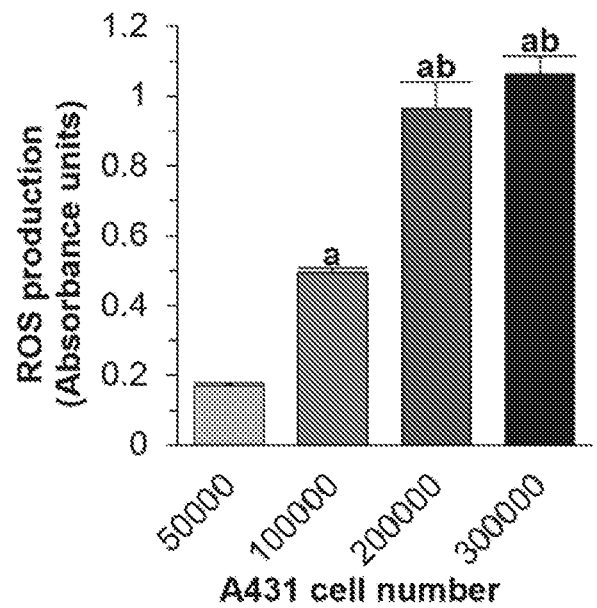

In order to test the ability of our SERS NPs to detect ROS in cancer cells, we incubated the NPs with human cancer cell lines (AsPC-1; FIGS. 4A-4C and A431; FIGS. 4D-4F)). Results showed that the intensity of the sharpest peak within the Raman fingerprint at 1365 cm$^{-1}$ significantly increased when the number of cells increased from 50,000 to 100,000, 200,000, and 300,000 (AsPC-1: 140±10 to 200±10, 280±15, and 350±15 cps and A431: 700±50 to 1000±100, 1400±100, and 1600±100 cps; (FIGS. 4A-4B, 4D-4E), P<0.05)). Verification that increasing the number of cancer cells resulted in an increased production of ROS, and hence the level of OS, was performed using a DCFH-DA assay (50,000, 100,000, 200,000, and 300,000 AsPC-1 cells: 0.15±0.04, to 0.51±0.06, 0.82±0.05, and 1.13±0.04 absorbance units and A431 cells: 0.17±0.01 to 0.49±0.01, 0.96±0.07 and 1.06±0.05 absorbance units) (FIGS. 4C, 4F; P<0.05).

Figure 5A:
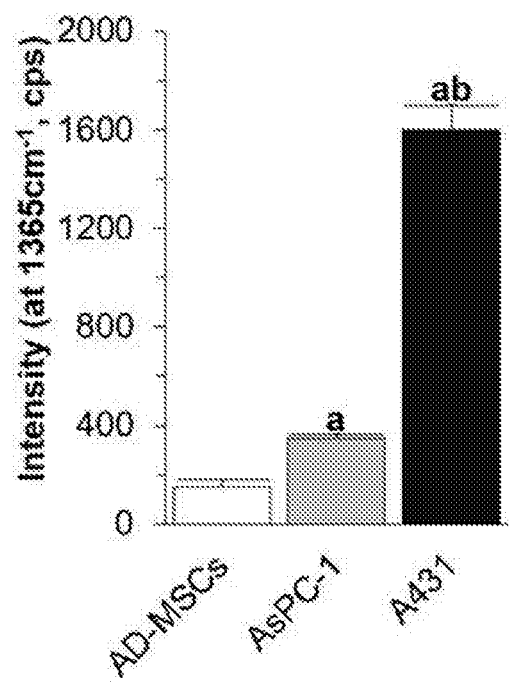
FIGS. 5A-5E. Ability of SERS NPs to detect OS in cancer cells. Raman signal intensities (FIG. 5A) and DCFH-DA assay (FIG. 5B) of AD-MSCs, AsPC-1 and A431 cells (300,000 cells) cultured with SERS NPs, confocal images of AD-MSCs (FIG. 5C), AsPC-1 (FIG. 5D) and A431 (FIG. 5E) cells cultured with SERS NPs showing the ability of SERS NPs to be uptaken by A431 (i.e., $\alpha_v\beta_6$ cells), significant differences.
Figure 5B:
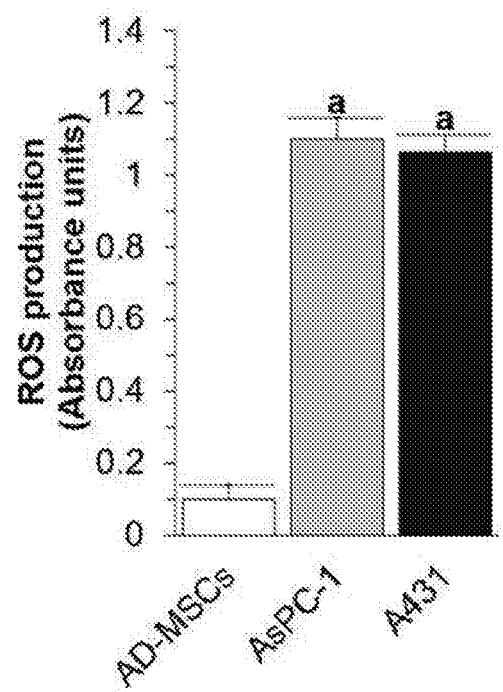
Figure 5C:
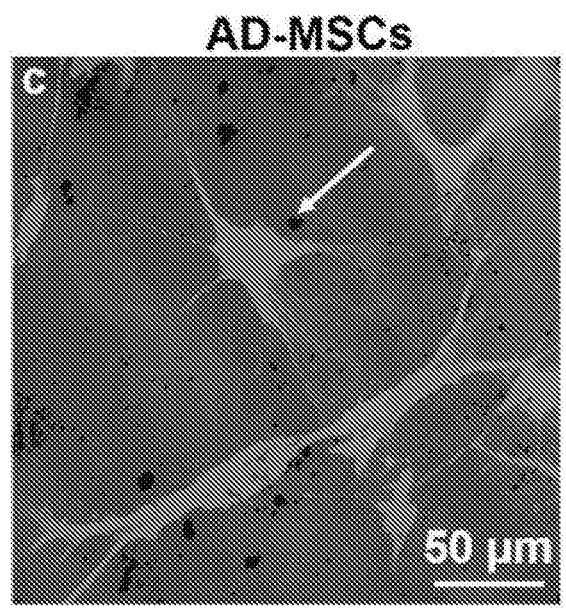
Figure 5D:
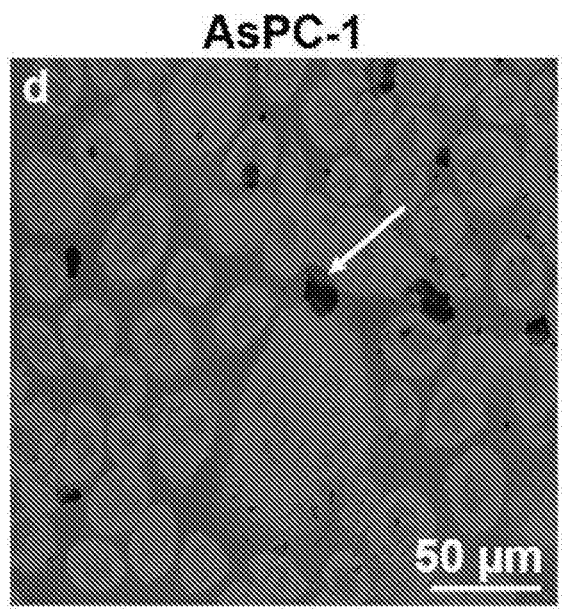
Figure 5E:
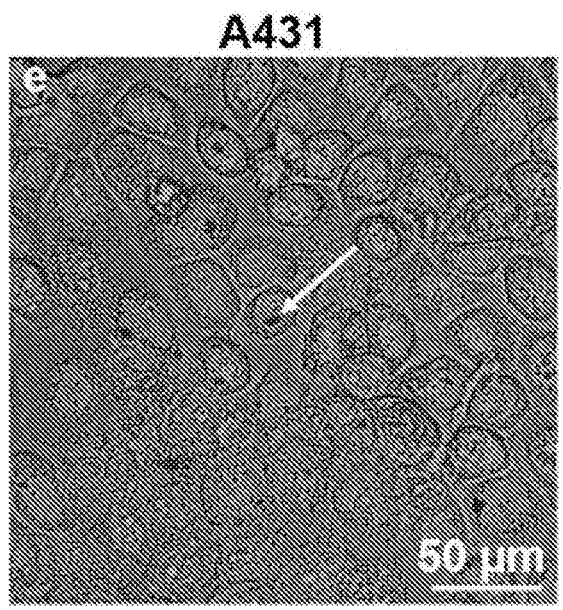
Figure 6A:
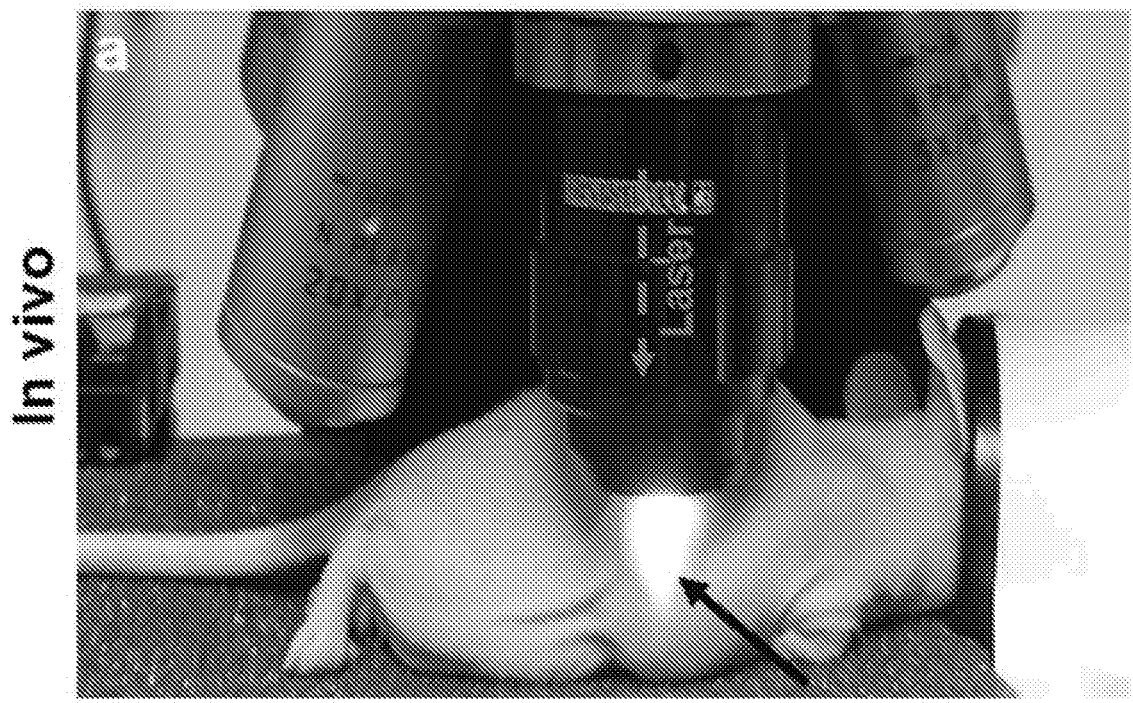
FIGS. 6A-6J. Ability of SERS NPs to detect OS in BxPC-3 xenograft tumor models. Raman imaging of the tumor following intravenous injection into animals both in vivo (FIGS. 6A-6B) and ex vivo (FIGS. 6C-6D). Imaging was also performed over the contra-lateral non-tumor side as control (FIGS. 6E-6F). Raman signal intensities obtained from control, in vivo and ex vivo (FIG. 6G), representative histological images from BxPC-3 xenograft tumors (FIGS. 6H-6J) showing the uptake and distribution of SERS NPs within the BxPC-3 xenograft tumor tissue following intravenous injection. Significant differences.
Figure 6B:
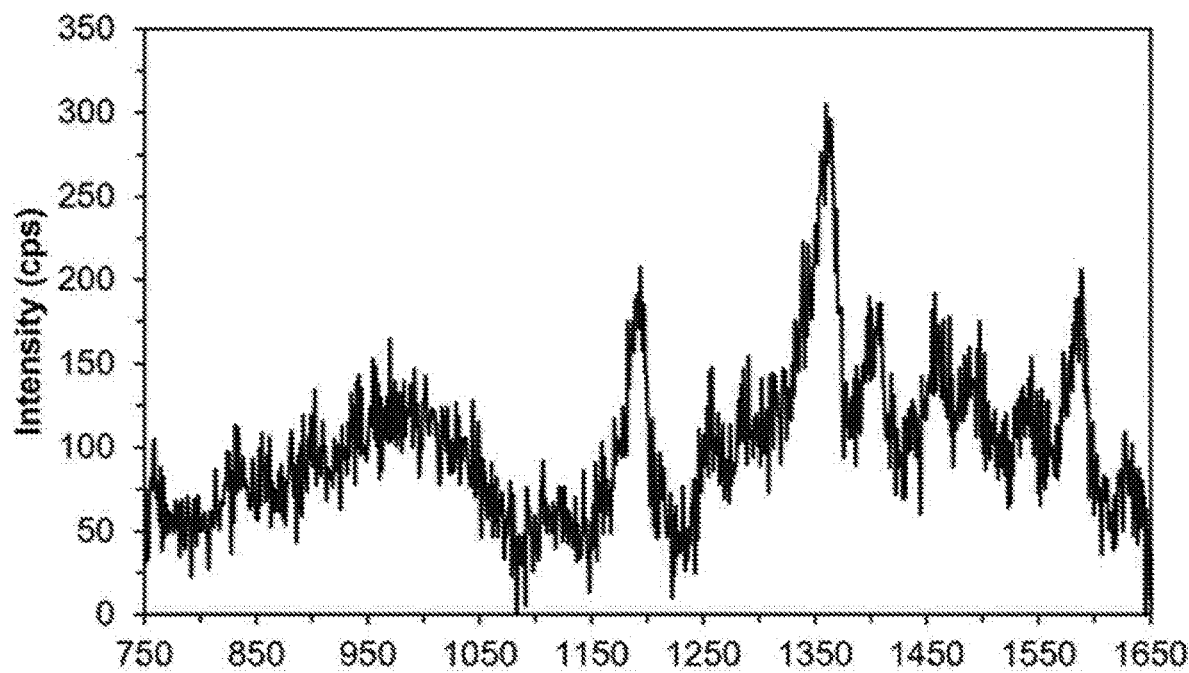
Figure 6C:
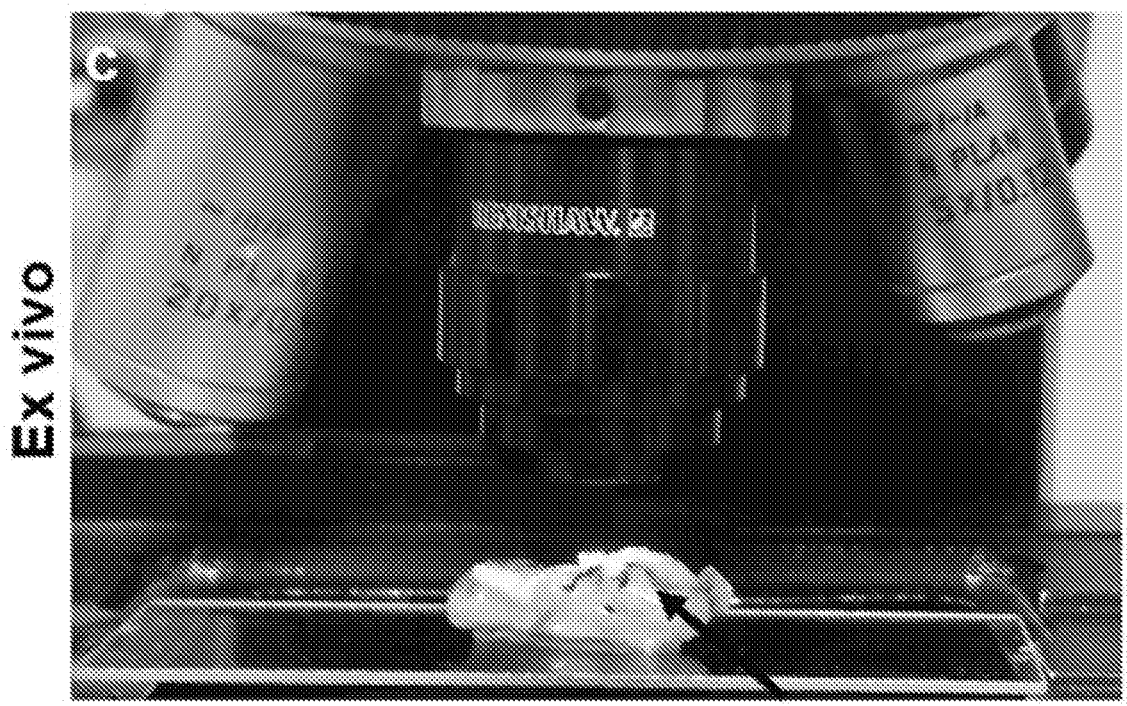
Figure 6D:
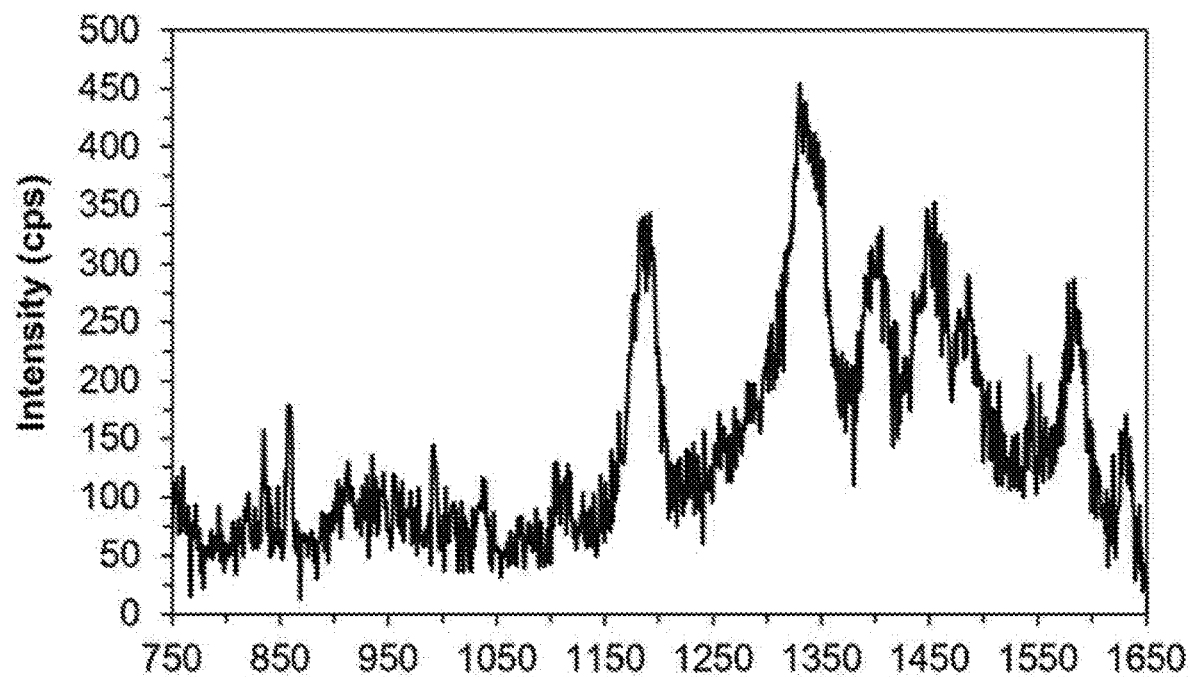
Figure 6E:
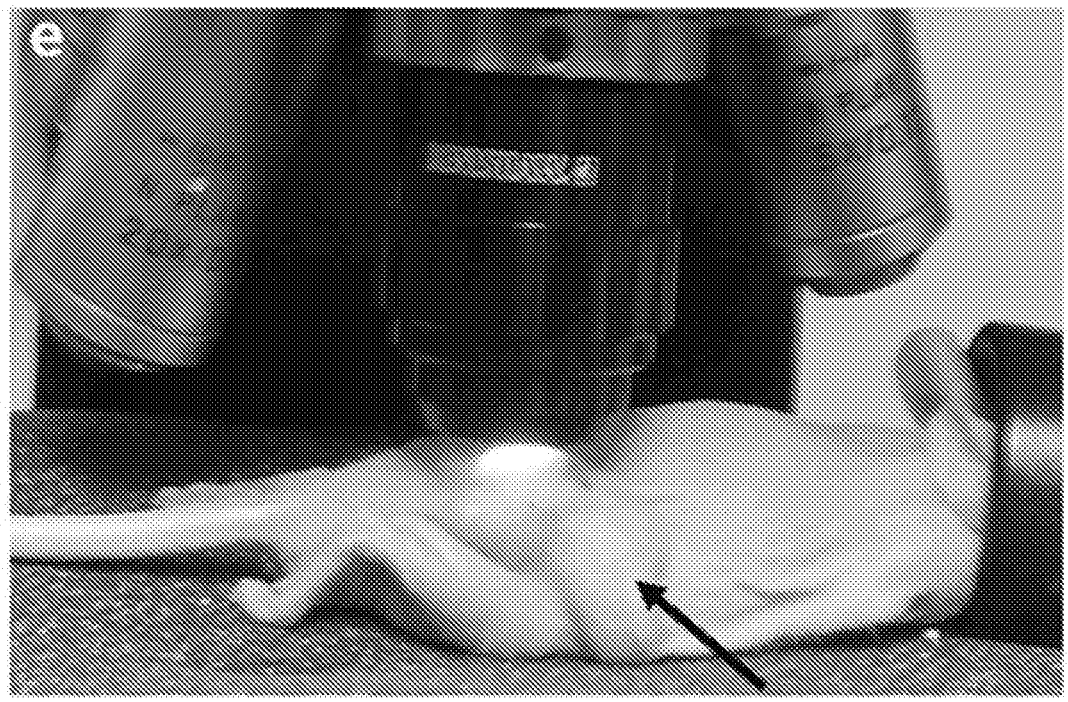
Figure 6F:
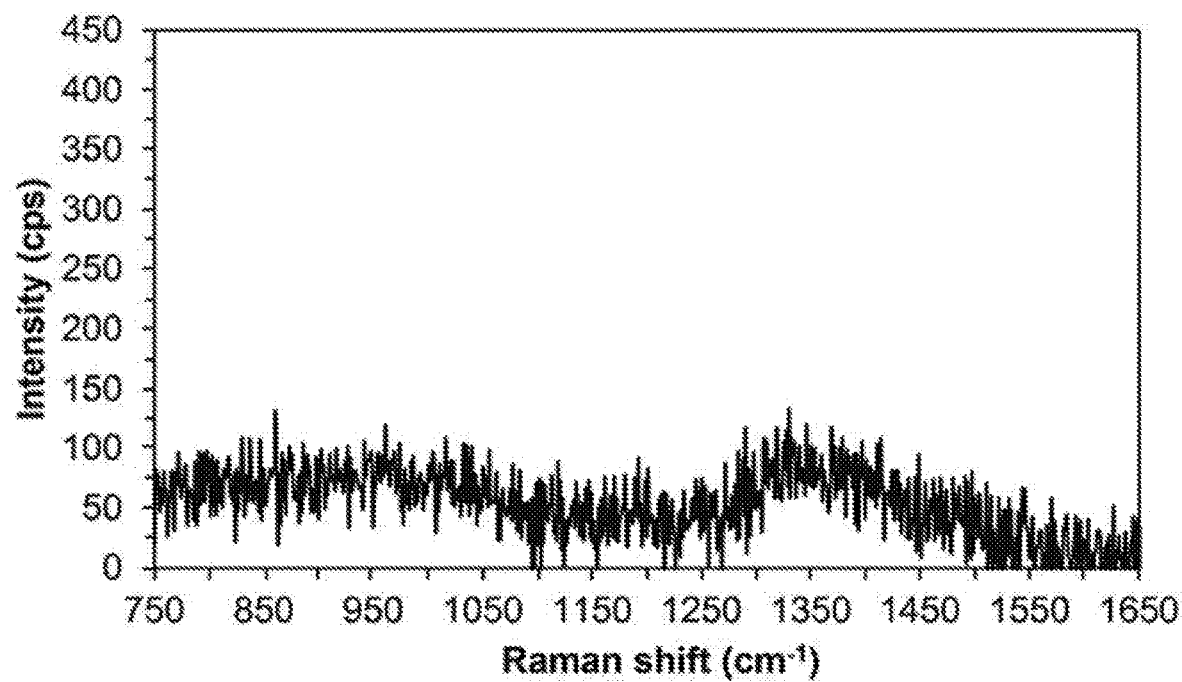
Figure 6G:
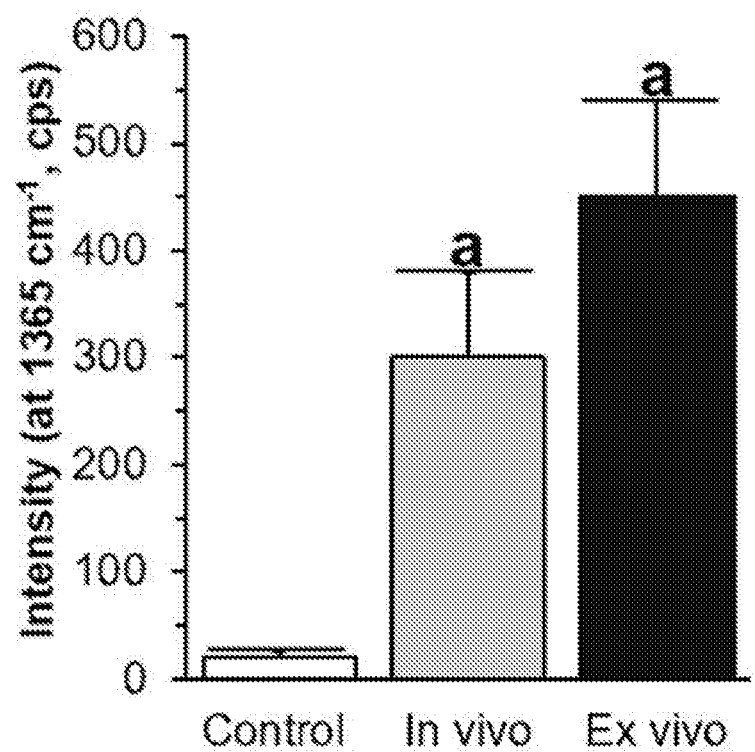
Figure 6H:
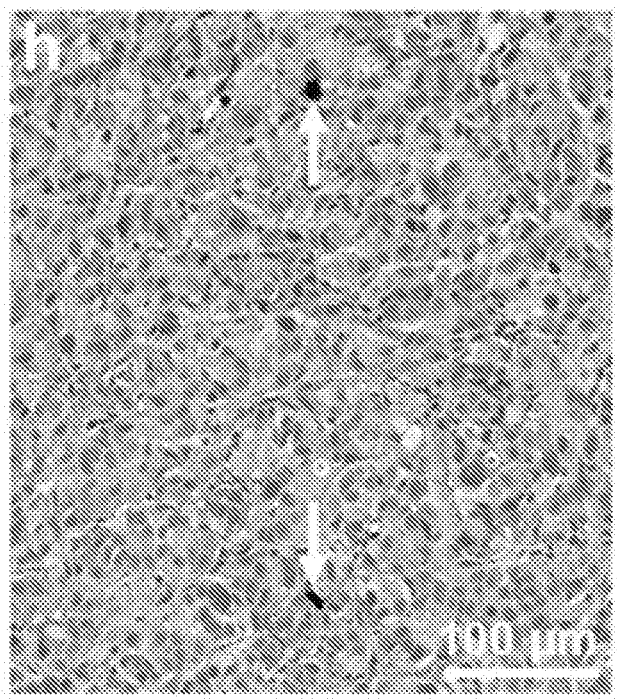
Figure 6I:
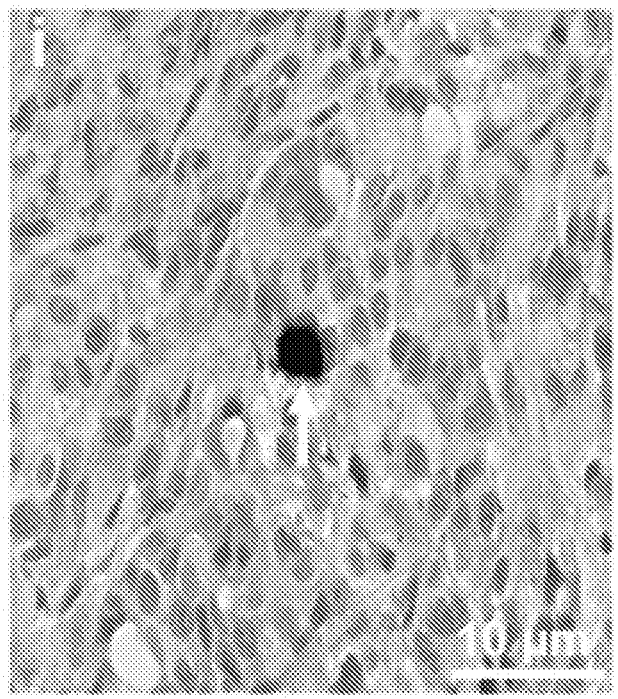
Figure 6J:
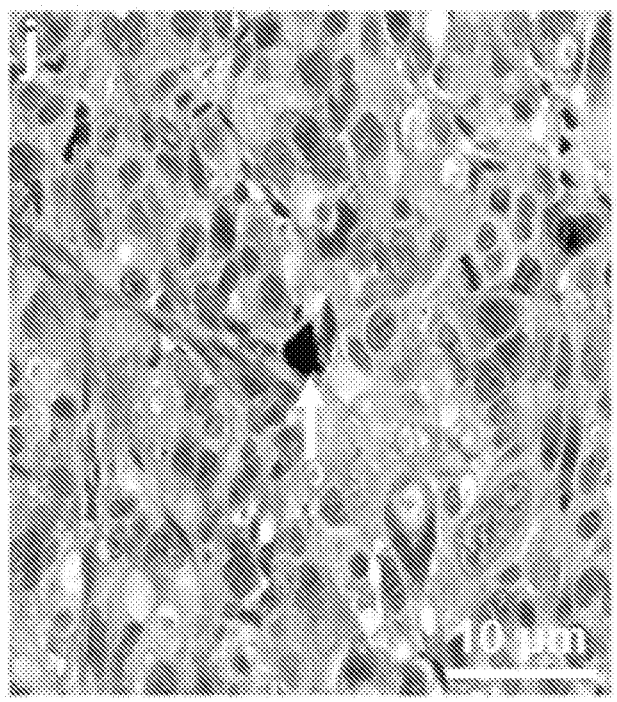

Comparing the Raman signal intensities between cells showed that with the same number of cells (i.e., 300,000 cells), the intensity of the sharpest peak at 1365 cm$^{-1}$ significantly decreased when tumor cells (AsPC-1: 350±15 cps and A431: 1600±100 cps) were compared to a control non-tumor cell line (AD-MSCs: 145±10 cps; FIG. 5A, P<0.05). This was further verified when the amount of ROS produced was measured with a DCFH-DA assay (AsPC-1: 0.10±0.02 and A431: 1.10±0.04 and AD-MSCs: 1.06±0.05, absorbance units, P<0.05; FIG. 5(b)). Confocal images showed that following incubation of SERS NPs with AD-MSCs, AsPC-1 and A431 cells for 24 h, a large amount of the SERS NPs had entered A431 cells. However, almost no SERS NPs could be detected within AD-MSCs and AsPC-1 cells, with the majority of nanoparticles appearing to reside outside these cells (FIGS. 5C-5E).

ii. In Vivo: Following intravenous injection of our SERS NPs into BxPC-3 xenograft tumor models, we were able to detect the Raman fingerprint of Rd123 in vivo, thereby demonstrating that our SERS NPs were able to detect OS in tumors in living animals (FIGS. 6(a-b)). After Raman imaging, animals were sacrificed and their tumors excised and imaged ex vivo. Our results showed that we were able to again detect the Raman fingerprint of Rd123 ex vivo (FIGS. 6C-6D) and that there was no significant difference in the Raman intensities of the spectral fingerprint (i.e., intensity of the sharpest peak at 1365 cm$^{-1}$ was 300±80 (in vivo) and 450±90 (ex vivo) cps; P<0.05). However, the Raman fingerprint of Rd123 was not able to be detected on the contralateral side of xenograft animals where there was no tumor present (intensity of sharpest peak at 1365 cm$^{-1}$ was 20±5 compared to 300±80 cps; P<0.05; FIGS. 6E-6G), thereby indicating that our SERS NPs were able to preferentially target the $\alpha_v\beta_6$ positive tumor. Histological analysis from BxPC-3 xenograft tumors showed that following intravenous injection, SERS NPs were taken up by tumor cells (FIGS. 6H-6J).

Cell Viability

Figure 7:
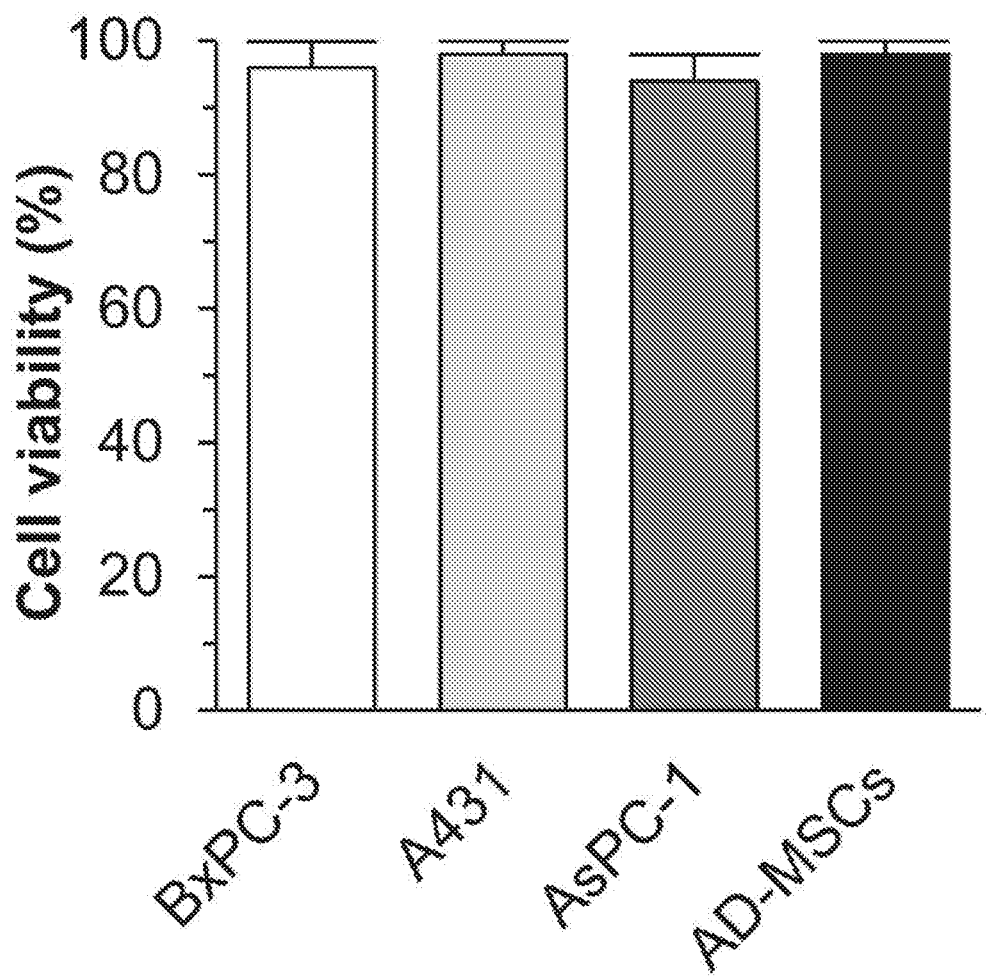
FIG. 7. Cell viability. Results of MTT assay showing the viability of BxPC-3, A431, AsPC-1 and AD-MSCs cells incubated with SERS NPs.

Relative to the control group (i.e., cells that were not incubated with our SERS NPs), there was no significant difference in cell viability when they were incubated with our SERS NPs (P>0.05). Results of MTT assays show that the viability of BxPC-3, A431, AsPC-1 and AD-MSCs cells incubated with our SERS NPs was 96±4, 98±2, 94±4, 98±2%, respectively (FIG. 7); this shows that our SERS NPs are highly biocompatible (nontoxic).

Discussion

Label-free Raman imaging has been used to discriminate healthy tissues from abnormal tissues (i.e., cancers of the skin, cervix, and gastrointestinal tract [28]) based on differences in their Raman spectral fingerprints. However, as the intrinsic Raman signal of native unprepared tissue is low, image acquisition therefore takes a long time. Hence, applications that require near real-time imaging must amplify the signal intensity of the Raman spectra being assessed. A common approach to enable rapid in vivo Raman imaging is to introduce exogenous contrast agents which can amplify a Raman signal many orders of magnitude greater than any intrinsic signal [29, 30]. One example is nanoparticles that take advantage of a phenomenon known as surface-enhanced Raman scattering (SERS). Studies have shown that PEGylated SERS NPs, consisting of an Au core and Raman layer encapsulated in a mesoporous-SiO$_2$ shell, can selectively accumulate in tumors where they can then create a signal with a high signal to background ratio [31]. The unique spectral fingerprints and biologically inert compositions of SERS NPs make them a promising contrast agent for in vivo cancer imaging [31]. Given that most cancers are subjected to elevated levels of OS [32], and the level of OS within a tumor is affected by its size, stage and response to treatment [33], we developed a SERS NP which can detect and quantify levels of ROS, and thus the amount of OS, using Raman imaging.

Metal NPs, especially those made from Au and Ag, have been widely used for Raman imaging given their ability to enable SERS based on their plasmonic properties [34, 35]. In the present study, we made the core of our SERS NP from Au given its biocompatibility [36] and excitation close to the IR region of visible light [37]. Next, we covalently linked a chemosensing molecule made from DHR123 onto our AuNP. Our results confirmed that in the presence of ROS, DHR123 is oxidized into Rd123 which results in the generation of a characteristic Raman spectral fingerprint when interrogated with light at a wavelength of 785 nm. Our AuNP-DHR123 was also coated with a mesoporous-SiO$_2$ layer which not only stabilizes the AuNP core, but also prevents desorption of the DHR123 layer from the AuNP core under physiological conditions, thereby ensuring consistency of the Raman fingerprint [31]. In addition, the mesoporous architecture contains channels to allow the passage of ROS to the DHR123 layer for their detection [38]. To enable our SERS NP to target tumors, we functionalized it with a cystine knot peptide targeted at integrin $\alpha_v\beta_6$. Studies have shown that $\alpha_v\beta_6$ integrin is not expressed on most normal adult tissues [39], but it is overexpressed in several cancers including pancreatic, lung, gastric, ovarian, endometrial, colorectal, oral, skin as well as in cholangiocarcinoma [27, 40]. Based on previous studies which have shown that similar sized SERS NPs were biocompatible and had no adverse effects in vivo [7, 41, 42,] we therefore believe that our SERP NP could be used as a new marker of biological marker of tumor OS.

Our in vitro results show that our SERS NP is able to detect ROS at different concentrations. Indeed, by using the characteristic peaks of Rd123, we have shown that our SERS NP is sensitive enough to detect ROS at femtomolar concentrations. Furthermore, as the concentration of ROS increased (i.e., to molar concentrations), there was also a corresponding increase in the intensity of the Raman signal. The increase in ROS detected by our SERS NP was validated using a conventional DCFH-DA assay which is able to directly measure ROS in solution. Our results are in keeping with previous studies which have also shown that similar NPs, made by linking DHR123 to the surface of AgNPs, could detect oxygen radicals in analytes in the femtomolar range with the strongest peak of the Raman signal also occurring at 1365 cm$^{-1}$ [23]. Our SERS NPs are also stable in acidic conditions (pH 6.5) for up to 1 month, producing nearly identical intensity Raman fingerprints in response to ROS. This is important since the tumor microenvironment is relatively acidic (pH 6.5-6.9) compared to normal tissues (pH 7.2-7.4), given their increased metabolic requirements with poor perfusion results in them having a relative anaerobic metabolism [26, 43].

Following incubation of our SERS NPs with cancer cells, the characteristic Raman fingerprint of Rd123 was detected and its intensity became stronger in direct relation to the number of cells that were present, thus confirming their ability to detect OS in cancer cells. The observed increase in the intensity of the Raman signal can be due to the increase in the amount of ROS produced by cells as validated by our DCFH-DA assay. Although, Rd123 Raman signals were observed when our SERS NPs were added with AD-MSCs (i.e., a non-cancer cell line), their intensities were significantly lower which can be attributed to them producing lower amounts of ROS when compared to cancer cells [44]. Again, these results were validated using a conventional DCFH-DA assay which showed that there was a significant reduction in the amount of produced ROS from AD-MSCs compared to both AsPC-1 and A431 cancer cells. Interestingly, our SERS NP were taken up into the cytosol of A431 cells as demonstrated by confocal microscopy; this is likely due to the nanoparticles being able to bind to the increased $\alpha_v\beta_6$ integrin expressed on these cells resulting in their internalization via endocytosis [45]. In this setting, it is likely that SERS NP were able to detect intracellular ROS, and thus changes in OS, compared to AsPC-1 and AD-MSCs cells where they likely detect extracellular ROS given their lack of internalization. Similarly, Jiang et al. [23] have shown the ability of their Ag-DHR123 NPs to detect intracellular OS in cervical cancer cells (HeLa) with optical imaging demonstrating NP penetration into cells. Although SERS NPs are taken up by cells which has been identified by confocal imaging in our study, flow cytometry can also be used to measure nanoparticle uptake which has the advantage of analyzing thousands of cells in seconds [46].

Finally, we created a xenograft tumor model using BxPC-3 cells; this model was chosen based on previous literature which has shown using flow cytometry analysis that BxPC-3 cells have high $\alpha_v\beta_6$ expression [25]. In addition, this animal xenograft model has been used in prior studies to validate the cystine knot peptide used to functionalize our nanoparticle. Following intravenous injection of SERS NPs into animals, we showed that functionalized SERS NPs were taken up by BxPC-3 xenograft tumors (as indicated by histological analysis) where they could detect tumoral OS (as indicated by in vivo Raman imaging). The ability of our SERS NP to specifically target tumors was shown when imaging the contralateral non-tumor side in the same animals which demonstrated no Rd123 signal. These results not only show the ability of our SERS NP to home and target tumors which have increased 046 integrin expression, but also that our SERS NP can detect OS within tumors.

Our SERS NPs therefore provides a powerful and sensitive tool for the detection of ROS. In the setting of cancer, our SERS NPs can help better evaluate tumoral OS which can change as the tumor evolves over time and as it responds to treatment. Furthermore, our SERS NPs have multimodal imaging properties given that the AuNP core can also serve as a contrast agent for CT and optoacoustic imaging. In addition, the mesoporous-$SiO_2$ shell can be coated with gadolinium for MRI [29] as well as with radioisotopes like 89Zr and 68Ga for PET [47, 48]. This, in combination with the fact that (i) SERS NPs are produced with biologically inert materials, (ii) other SERS NPs of similar size and material composition have been shown to be nontoxic [41] and (iii) other Au or Au-mesoporous-$SiO_2$ NPs have already advanced to clinical trials [42], together suggest a viable path towards clinical translation of our SERS NPs. Although Raman spectroscopy is limited in its ability to detect signals from deep tissues, this can be addressed in the future by using spatially offset Raman spectroscopy (SORS) [49], which is based on the detection of Raman-shifted photons offset from the excitation position and can detect nanoparticles at tissue depths of several centimeters [50]. Additional studies can also be done to explore different shapes of our SERS NP to further improve signal intensity. For instance, Harmsen et al. synthesized and tested a new star-shaped nanoparticle that is resonant in the near-infrared (NIR) window, where optical penetration in tissue is maximized; these SERS nanostars had a ~400-fold improvement over that of other recently reported SERS NPs [7].

In summary, our SERS NPs can detect ROS both in vitro over a wide concentration range (i.e., from femtomolar to molar) as well as in a living animal xenograft model, thereby opening the potential for it to be used in several applications within oncology where detection of OS is of significant importance.

REFERENCES

1. McCord, J. M., 1974. Free radicals and inflammation: Protection of synovial fluid by superoxide dismutase. *Science,* 185, pp. 529-531.
2. Mileo, A. M. and Miccadei, S., 2015. Polyphenols as modulator of oxidative stress in cancer disease: New therapeutic strategies. *Oxidative Medicine and Cellular Longevity,* 2016, pp. 1-17.
3. Huo, L., Li, C. W., Huang, T. H., Lam, Y. C., Xia, W., Tu, C., Chang, W. C., Hsu, J. L., Lee, D. F. and Nie, L., 2014. Activation of Keap1/Nrf2 signaling pathway by nuclear epidermal growth factor receptor in cancer cells. *American Journal of Translational Research,* 6, pp. 649-663.
4. Maeda, H., Fukuyasu, Y., Yoshida, S., Fukuda, M., Saeki, K., Matsuno, H., Yamauchi, Y., Yoshida, K., Hirata, K. and Miyamoto, K., 2004. Fluorescent probes for hydrogen peroxide based on a non-oxidative mechanism. *Angewandte Chemie International Edition,* 43, pp. 2389-2391.
5. Van de Bittner, G. C., Dubikovskaya, E. A., Bertozzi, C. R. and Chang, C. J., 2010. In vivo imaging of hydrogen peroxide production in a murine tumor model with a chemoselective bioluminescent reporter. *Proceedings of the National Academy of Sciences,* 107, pp. 21316-21321.
6. Keren, S., Zavaleta, C., Cheng, Z., de La Zerda, A., Gheysens, O. and Gambhir, S., 2008. Noninvasive molecular imaging of small living subjects using Raman spectroscopy. *Proceedings of the National Academy of Sciences,* 105, pp. 5844-5849.
7. Harmsen, S., Huang, R., Wall, M. A., Karabeber, H., Samii, J. M., Spaliviero, M., White, J. R., Monette, S., O'Connor, R. and Pitter, K. L., 2015. Surface-enhanced resonance Raman scattering nanostars for high-precision cancer imaging. *Science Translational Medicine,* 7, pp. 271ra7-271ra7.
8. Banholzer, M. J., Millstone, J. E., Qin, L. and Mirkin, C. A., 2008. Rationally designed nanostructures for surface-enhanced Raman spectroscopy. *Chemical Society Reviews,* 37, pp. 885-97.
9. Le Ru, E., Blackie, E., Meyer, M. and Etchegoin, P. G., 2007 Surface enhanced Raman scattering enhancement factors: A comprehensive study. *The Journal of Physical Chemistry C*, 111, pp. 13794-13803.
10. Hee An, J., Lee, K. J. and Choi, J. W., 2016. Gold nanoparticles-based barcode analysis for detection of norepinephrine. *Journal of Biomedical Nanotechnology*, 12, pp. 357-365.
11. Srinivasan, S., Bhardwaj, V., Nagasetti, A., Fernandez-Fernandez, A. and McGoron, A. J., 2016. Multifunctional surface-enhanced raman spectroscopy-detectable silver nanoparticles for combined photodynamic therapy and pH-triggered chemotherapy. *Journal of Biomedical Nanotechnology*, 12, pp. 2202-2219.
12. Chen, Y., Cheng, S., Zhang, A., Song, J., Chang, J., Wang, K., Zhang, Y., Li, S., Liu, H. and Alfranca, G., 2018. Salivary analysis based on surface enhanced raman scattering sensors distinguishes early and advanced gastric cancer patients from healthy persons. *Journal of Biomedical Nanotechnology*, 14, pp. 1773-1784.
13. Qian, X. M. and Nie, S., 2008. Single-molecule and single-nanoparticle SERS: From fundamental mechanisms to biomedical applications. *Chemical Society Reviews*, 37, pp. 912-920.
14. Sipos, B., Hahn, D., Carceller, A., Piulats, J., Hedderich, J., Kalthoff, H., Goodman, S., Kosmahl, M. and Klöppel, G., 2004. Immunohistochemical screening for β6-integrin subunit expression in adenocarcinomas using a novel monoclonal antibody reveals strong up-regulation in pancreatic ductal adenocarcinomas in vivo and in vitro. *Histopathology*, 45, pp. 226-236.
15. Elayadi, A. N., Samli, K. N., Prudkin, L., Liu, Y. H., Bian, A., Xie, X. J., Wistuba, I. I., Roth, J. A., McGuire, M. J. and Brown, K. C., 2007. A peptide selected by biopanning identifies the integrin $\alpha_v\beta_6$ as a prognostic biomarker for nonsmall cell lung cancer. *Cancer Research*, 67, pp. 5889-5895.
16. Zhuang, Z., Zhou, R., Xu, X., Tian, T., Liu, Y., Liu, Y., Lian, P., Wang, J., and Xu, K., 2013. Clinical significance of integrin $\alpha_v\beta_6$ expression effects on gastric carcinoma invasiveness and progression via cancer-associated fibroblasts. *Medical Oncology*, 30, pp. 580-587.
17. Ahmed, N., Pansino, F., Clyde, R., Murthi, P., Quinn, M., Rice, G., Agrez, M., Mok, S. and Baker, M., 2002. Overexpression of $\alpha_v\beta_6$ integrin in serous epithelial ovarian cancer regulates extracellular matrix degradation via the plasminogen activation cascade. *Carcinogenesis*, 23, pp. 237-244.
18. Hecht, J. L., Dolinski, B. M., Gardner, H. A., Violette, S. M. and Weinreb, P. H., 2008. Overexpression of the $\alpha_v\beta_6$ integrin in endometrial cancer. *Applied Immunohistochemistry & Molecular Morphology*, 16, pp. 543-547.
19. Yang, G. Y., Xu, K. S., Pan, Z. Q., Zhang, Z. Y., Mi, Y. T., Wang, J. S., Chen, R. and Niu, J., 2008. Integrin $\alpha_v\beta_6$ mediates the potential for colon cancer cells to colonize in and metastasize to the liver. *Cancer Science*, 99, pp. 879-887.
20. Xue, H., Atakilit, A., Zhu, W., Li, X., Ramos, D. M. and Pytela, R., 2001. Role of the $\alpha_v\beta_6$ integrin in human oral squamous cell carcinoma growth in vivo and in vitro. *Biochemical and Biophysical Research Communications*, 288, pp. 610-618.
21. Janes, S. M. and Watt, F. M., 2004. Switch from $\alpha_v\beta_5$ to $\alpha_v\beta_6$ integrin expression protects squamous cell carcinomas from anoikis. *Journal of Cell Biology*, 166, pp. 419-431.
22. Rigoulet, M., Yoboue, E. D. and Devin, A., 2011. Mitochondrial ROS generation and its regulation: Mechanisms involved in $H_2O_2$ signaling. *Antioxidants & Redox Signaling*, 14, pp. 459-468.
23. Jiang, C., Liu, R., Han, G. and Zhang, Z., 2013. A chemically reactive Raman probe for ultrasensitively monitoring and imaging the in vivo generation of femtomolar oxidative species as induced by anti-tumor drugs in living cells. *Chemical Communications*, 49, pp. 6647-6649.
24. Lei, B., Adachi, N. and Arai, T., 1998. Measurement of the extracellular $H_2O_2$ in the brain by microdialysis. *Brain Research Protocols*, 3, pp. 33-36.
25. Tummers, W. S., Kimura, R. H., Abou-Elkacem, L., Vahrmeijer, A. L., Swijnenburg, R. J., Willmann, J. K. and Gambhir, S. S., 2018. Development and preclinical validation of a cysteine knottin peptide targeting integrin $\alpha_v\beta_6$ for near-infrared fluorescent-guided surgery in pancreatic cancer. *Clinical Cancer Research*, 2491, pp. 1667-1676.
26. Bellone, M., Calcinotto, A., Filipazzi, P., De Milito, A., Fais, S. and Rivoltini, L., 2013. The acidity of the tumor microenvironment is a mechanism of immune escape that can be overcome by proton pump inhibitors. *Oncoimmunology*, 2, pp. e22058-1-e22058-3.
27. Kimura, R. H., Teed, R., Hackel, B. J., Pysz, M. A., Chuang, C. Z., Sathirachinda, A., Willmann, J. K. and Gambhir, S. S., 2012. Pharmacokinetically stabilized cystine knot peptides that bind alpha-v-beta-6 integrin with single-digit nanomolar affinities for detection of pancreatic cancer. *Clinical Cancer Research*, 18, pp. 839-849.
28. Pence, I. and Mahadevan-Jansen, A., 2016. Clinical instrumentation and applications of Raman spectroscopy. *Chemical Society Reviews*, 45, pp. 1958-1979.
29. Kircher, M. F., De La Zerda, A., Jokerst, J. V., Zavaleta, C. L., Kempen, P. J., Mittra, E., Pitter, K., Huang, R., Campos, C. and Habte, F., 2012. A brain tumor molecular imaging strategy using a new triple-modality MRI-photoacoustic-Raman nanoparticle. *Nature Medicine*, 18, pp. 829-834.
30. Wang, Y., Yan, B. and Chen, L., 2012. SERS tags: Novel optical nanoprobes for bioanalysis. *Chemical Reviews*, 113, pp. 1391-1428.
31. Harmsen, S., Wall, M. A., Huang, R. and Kircher, M. F., 2017. Cancer imaging using surface-enhanced resonance Raman scattering nanoparticles. *Nature Protocols*, 12, pp. 1400-1414.
32. Halliwell, B., 2007. Oxidative stress and cancer: Have we moved forward? *Biochemical Journal*, 401, pp. 1-11.
33. Reuter, S., Gupta, S. C., Chaturvedi, M. M. and Aggarwal, B. B., 2010. Oxidative stress, inflammation, and cancer: How are they linked? *Free Radical Biology and Medicine*, 49, pp. 1603-1616.
34. Seney, C. S., Gutzman, B. M. and Goddard, R. H., 2008. Correlation of size and surface-enhanced Raman scattering activity of optical and spectroscopic properties for silver nanoparticles. *The Journal of Physical Chemistry C*, 113, pp. 74-80.
35. Stamplecoskie, K. G., Scaiano, J. C., Tiwari, V. S. and Anis, H., 2011. Optimal size of silver nanoparticles for surface-enhanced Raman spectroscopy. *The Journal of Physical Chemistry C*, 115, pp. 1403-1409.
36. Kneipp, J., Kneipp, H., Wittig, B. and Kneipp, K., 2010. Novel optical nanosensors for probing and imaging live cells. *Nanomedicine: Nanotechnology, Biology and Medicine*, 6, pp. 214-226.
37. Jain, P. K., Huang, X., El-Sayed, I. H. and El-Sayed, M. A., 2007. Review of some interesting surface plasmon resonance-enhanced properties of noble metal nanoparticles and their applications to biosystems. it Plasmonics, 2, pp. 107-118.
38. Zhang, Z., Wang, L., Wang, J., Jiang, X., Li, X., Hu, Z., Ji, Y., Wu, X. and Chen, C., 2012. Mesoporous silica-coated gold nanorods as a light-mediated multifunctional theranostic platform for cancer treatment. *Advanced Materials*, 24, pp. 1418-1423.
39. Breuss, J., Gallo, J., DeLisser, H., Klimanskaya, I., Folkesson, H., Pittet, J., Nishimura, S., Aldape, K., Landers, D. and Carpenter, W., 1995. Expression of the beta 6 integrin subunit in development, neoplasia and tissue repair suggests a role in epithelial remodeling. *Journal of Cell Science*, 108, pp. 2241-2251.
40. Zhang, C., Kimura, R., Abou-Elkacem, L., Levi, J., Xu, L. and Gambhir, S. S., 2016. A cystine knot peptide targeting integrin aj36 for photoacoustic and fluorescence imaging of tumors in living subjects. *Journal of Nuclear Medicine*, 57, pp. 1629-1634.
41. Thakor, A. S., Luong, R., Paulmurugan, R., Lin, F. I., Kempen, P., Zavaleta, C., Chu, P., Massoud, T. F., Sinclair, R. and Gambhir, S. S., 2011. The fate and toxicity of Raman-active silica-gold nanoparticles in mice. *Science Translational Medicine*, 3, pp. 79ra33-79ra33.
42. Thakor, A. S. and Gambhir, S. S., 2013. Nanooncology: The future of cancer diagnosis and therapy. *CA: A Cancer Journal for Clinicians*, 63, pp. 395-418.
43. Estrella, V., Chen, T., Lloyd, M., Wojtkowiak, J., Cornnell, H. H., Ibrahim-Hashim, A., Bailey, K., Balagurunathan, Y., Rothberg, J. M. and Sloane, B. F., 2013. Acidity generated by the tumor microenvironment drives local invasion. *Cancer Research*, 73, pp. 1524-35.
44. Sullivan, L. B. and Chandel, N. S., 2014. Mitochondrial reactive oxygen species and cancer. *Cancer & Metabolism*, 2, pp. 1-12.
45. Marelli, U. K., Rechenmacher, F., Sobahi, T. R. A., Mas-Moruno, C. and Kessler, H., 2013. Tumor targeting via integrin ligands. *Frontiers in Oncology*, 3, pp. 1-12.
46. Ibuki, Y. and Toyooka, T., 2012. *Nanotoxicity*. Springer.
47. Shaffer, T. M., Wall, M. A., Harmsen, S., Longo, V. A., Drain, C. M., Kircher, M. F. and Grimm, J., 2015. Silica nanoparticles as substrates for chelator-free labeling of oxophilic radioisotopes. *Nano Letters*, 15, pp. 864-868.
48. Shaffer, T. M., Harmsen, S., Khwaja, E., Kircher, M. F., Drain, C. M. and Grimm, J., 2016. Stable radiolabeling of sulfur-functionalized silica nanoparticles with copper-64. *Nano Letters*, 16, pp. 5601-5604.
49. Matousek, P., Clark, I., Draper, E., Morris, M., Goodship, A., Everall, N., Towrie, M., Finney, W. and Parker, A., 2005. Subsurface probing in diffusely scattering media using spatially offset Raman spectroscopy. *Applied Spectroscopy*, 59, pp. 393-400.
50. Stone, N., Kerssens, M., Lloyd, G. R., Faulds, K., Graham, D. and Matousek, P., 2011. Surface enhanced spatially offset Raman spectroscopic (SESORS) imaging—the next dimension. *Chemical Science*, 2, pp. 776-780.

What is claimed is:

1. A surface enhanced Raman scattering (SERS) nanoparticle for ROS detection comprising:
   a) a core comprising a biocompatible metal;
   b) a layer comprising dihydrorhodamine123 (DHR123), wherein the DHR123 is covalently linked to the core; and
   c) a mesoporous outer shell comprising a plurality of pores arranged to allow a reactive oxygen species (ROS) to enter through the plurality of pores to interact with the layer comprising DHR123, oxidize the DHR123 to produce rhodamine123 (Rd123).

2. The SERS nanoparticle of claim 1, wherein the biocompatible metal is a noble metal.

3. The SERS nanoparticle of claim 2, wherein the noble metal is gold or silver.

4. The SERS nanoparticle of claim 1, wherein the mesoporous outer shell comprises $SiO_2$.

5. The SERS nanoparticle of claim 1, further comprising a targeting agent attached to the mesoporous outer shell.

6. The SERS nanoparticle of claim 5, wherein the targeting agent selectively localizes the SERS nanoparticle to cancerous cells.

7. The SERS nanoparticle of claim 6, wherein the targeting agent is a cystine knot peptide that binds to integrin $\alpha_v\beta_6$, or an antibody, an antibody mimetic, a peptide, a peptoid, an aptamer, or a small molecule ligand that selectively binds to a tumor-specific antigen or a tumor-associated antigen.

8. The SERS nanoparticle of claim 1, further comprising a contrast agent or a radioisotope suitable for medical imaging attached to the mesoporous outer shell.

9. The SERS nanoparticle of claim 1, further comprising an anti-cancer therapeutic agent attached to the mesoporous outer shell.

10. A composition comprising the SERS nanoparticle of claim 1 and a pharmaceutically acceptable excipient.

11. A method of using the SERS nanoparticle of claim 1 for detecting reactive oxygen species (ROS), the method comprising:
    a) contacting the ROS with the SERS nanoparticle and
    b) performing Raman spectroscopy to detect a Raman fingerprint of rhodamine123 (Rd123), wherein oxidation of DHR123 to Rd123 indicates presence of the ROS.

12. The method of claim 11, further comprising quantifying the ROS from the intensity of a Raman signal for Rd123.

13. The method of claim 11, wherein said detecting the Raman fingerprint of Rd123 comprises measuring an intensity of a Raman spectroscopic signal at one or more wavenumbers selected from the group consisting of 765 $cm^{-1}$, 864 $cm^{-1}$, 915 $cm^{-1}$, 1002 $cm^{-1}$, 1081 $cm^{-1}$, 1115 $cm^{-1}$, 1181 $cm^{-1}$, 1250 $cm^{-1}$, 1279 $cm^{-1}$, 1365 $cm^{-1}$, 1400 $cm^{-1}$, 1454 $cm^{-1}$, 1488 $cm^{-1}$, 1548 $cm^{-1}$, 1587 $cm^{-1}$, and 1630 $cm^{-1}$.

14. A method of using the SERS nanoparticle of claim 7 for detecting reactive oxygen species (ROS) in a cancerous cell that overexpresses integrin $\alpha_v\beta_6$, the method comprising:
    a) contacting the cancerous cell with the SERS nanoparticle of claim 7, wherein the cystine knot peptide binds to integrin $\alpha_v\beta_6$ on the cancerous cells; and
    b) performing Raman spectroscopy to detect a Raman fingerprint of rhodamine123 (Rd123), wherein oxidation of DHR123 to Rd123 indicates presence of the ROS in the cancerous cell.

15. A method of detecting reactive oxygen species (ROS) in a subject, the method comprising:
    a) administering the composition of claim 10 to the subject; and
    b) performing Raman spectroscopy at a site of interest to detect a Raman fingerprint of rhodamine123 (Rd123), wherein oxidation of DHR123 to Rd123 indicates presence of the ROS at the site of interest in the subject.

16. The method of claim 15, wherein the site of interest comprises cancerous cells, inflammation, or ischemia.

17. The method of claim 16, wherein the SERS nanoparticle comprises a targeting agent that selectively localizes the SERS nanoparticle to the cancerous cells.

18. The method of claim 17, wherein the targeting agent is a cystine knot peptide that binds to integrin $\alpha_v\beta_6$ on the cancerous cells, or an antibody, an antibody mimetic, a peptide, a peptoid, an aptamer, or a small molecule ligand that selectively binds to a tumor-specific antigen or a tumor-associated antigen on the cancerous cells.

19. The method of claim 15, wherein the SERS nanoparticle further comprises a contrast agent or a radioisotope suitable for medical imaging attached to the mesoporous outer shell.

20. The method of claim 15, wherein said performing Raman spectroscopy comprises performing spatially offset Raman spectroscopy (SORS), inverse SORS, or micro-spatially offset Raman spectroscopy (micro-SORS).

21. A surface-enhanced Raman spectroscopy (SERS) system comprising:
   a) a light source emitting near infrared light;
   b) a SERS nanoparticle of claim 1; and
   c) a detector that can monitor SERS spectra coupled with a means to detect a Raman fingerprint of rhodamine123 (Rd123).

* * * * *